US006666122B2

(12) United States Patent
Raney et al.

(10) Patent No.: US 6,666,122 B2
(45) Date of Patent: Dec. 23, 2003

(54) WEB OR SHEET-FED APPARATUS HAVING HIGH-SPEED MECHANISM FOR SIMULTANEOUS X, Y AND θ REGISTRATION AND METHOD

(75) Inventors: Charles C. Raney, Lenexa, KS (US); Hongli Du, Olathe, KS (US); John T. Pierson, Jr., Shawnee Mission, KS (US)

(73) Assignee: Preco Industries, Inc., Lenexa, KS (US)

( * ) Notice: Subject to any disclaimer, the term of this patent is extended or adjusted under 35 U.S.C. 154(b) by 0 days.

(21) Appl. No.: 09/945,338

(22) Filed: Aug. 30, 2001

(65) Prior Publication Data

US 2002/0050202 A1 May 2, 2002

Related U.S. Application Data

(63) Continuation of application No. 08/825,368, filed on Mar. 28, 1997, now abandoned.

(51) Int. Cl.[7] ............................ B23Q 1/25; B26D 7/01

(52) U.S. Cl. ............................ 83/451; 83/418; 83/561; 83/649; 83/658; 74/490.08; 108/143; 269/21; 269/58; 269/71

(58) Field of Search .......................... 83/210, 523, 559, 83/561, 562, 35, 36, 410, 418, 421, 451, 649, 650, 658, 282; 248/660, 661, 662, 663; 74/490.07, 490.08, 490.09; 108/137, 140, 143; 269/21, 58, 71, 73, 75

(56) References Cited

U.S. PATENT DOCUMENTS 3,370,492 A 2/1968 Treff
3,385,244 A 5/1968 Ramsey et al.
3,424,413 A * 1/1969 Applegate ............... 108/143 X
3,486,441 A 12/1969 Hillman et al.
3,499,714 A 3/1970 Schellenberg
3,584,487 A 6/1971 Carlson
3,762,250 A 10/1973 Huskey
3,801,959 A 4/1974 O'Brien
3,811,768 A 5/1974 Zahn et al.
3,848,490 A 11/1974 Arel
3,915,780 A 10/1975 Broussard et al.
3,919,561 A 11/1975 Coberley
3,962,026 A 6/1976 Lottridge
4,109,158 A 8/1978 Blitchington et al.
4,151,451 A 4/1979 Maertins et al.
4,205,769 A 6/1980 Blitchington
4,222,396 A * 9/1980 Anderson et al. ........... 131/105
4,223,257 A 9/1980 Miller
4,240,778 A 12/1980 Korytko (List continued on next page.)

FOREIGN PATENT DOCUMENTS

EP 0109101 5/1984

OTHER PUBLICATIONS

G.Y. Onada, Jr., and L.L. Hench, editors—"Ceramic Processing Before Firing." (Wiley, NY, 1978), pp. 411–413, 426–428, and 433.

(List continued on next page.)

*Primary Examiner*—Clark F. Dexter
(74) *Attorney, Agent, or Firm*—Hovey Williams LLP

(57) ABSTRACT

High speed, extremely accurate web or sheet-fed segment die cutting or lamination apparatus (30, 300) has a processing station (32, 300), which receives a sheet or web segment, and is provided with a vacuum hold-down plate (142, 306) for holding initially fed segments (38). The plate is shiftable as necessary along orthogonal X-Y axes in the plane of the segment (38), and/or is rotatable about a θ axis transverse to the segment plane. Plate movement is effected by a series of aligned, translatable eccentric drive units (178–182, 346–350). Segments (38) carry positioning fiducials (44) that are compared with fixed reference indicia (250, 252) in the station (32, 300). The comparison data is used by a controller (254) to generate the plate movement information used in simultaneous operation of the associated plate drive units (178–182, 346–350).

7 Claims, 11 Drawing Sheets

U.S. PATENT DOCUMENTS

| | | | | |
|---|---|---|---|---|
| RE30,601 | E | | 5/1981 | Horr et al. |
| 4,275,627 | A | * | 6/1981 | Anderson et al. ......... 83/561 X |
| 4,285,258 | A | * | 8/1981 | Logan et al. ................. 83/410 |
| 4,307,961 | A | | 12/1981 | Blitchington et al. |
| 4,328,553 | A | | 5/1982 | Fredriksen et al. |
| 4,343,670 | A | | 8/1982 | Brown |
| 4,372,800 | A | | 2/1983 | Oizumi et al. |
| 4,399,675 | A | | 8/1983 | Erdmann et al. |
| 4,409,063 | A | | 10/1983 | Brown |
| 4,447,945 | A | | 5/1984 | Priscsak |
| 4,449,434 | A | | 5/1984 | Johnson |
| 4,481,533 | A | | 11/1984 | Alzmann et al. |
| 4,481,847 | A | | 11/1984 | Schneider et al. |
| 4,520,702 | A | | 6/1985 | Davis et al. |
| 4,527,243 | A | | 7/1985 | Loose |
| 4,536,239 | A | | 8/1985 | Benson |
| 4,537,124 | A | | 8/1985 | Graboyes |
| 4,538,177 | A | | 8/1985 | Morison |
| 4,541,317 | A | | 9/1985 | Van Humbeeck et al. |
| 4,541,722 | A | | 9/1985 | Jenks |
| 4,541,886 | A | | 9/1985 | Marlow et al. |
| 4,544,311 | A | | 10/1985 | Husain |
| 4,553,311 | A | | 11/1985 | Medico |
| 4,555,968 | A | | 12/1985 | Raney et al. |
| 4,624,126 | A | | 11/1986 | Avila et al. |
| 4,653,369 | A | | 3/1987 | Dunsirn |
| 4,672,870 | A | | 6/1987 | Levene et al. |
| 4,694,719 | A | | 9/1987 | Levene et al. |
| 4,697,485 | A | | 10/1987 | Raney |
| 4,706,565 | A | | 11/1987 | Martin et al. |
| 4,735,961 | A | | 4/1988 | Baldwin et al. |
| 4,738,175 | A | | 4/1988 | Little et al. |
| 4,748,571 | A | | 5/1988 | Shippy |
| 4,779,001 | A | | 10/1988 | Makosch |
| 4,784,377 | A | | 11/1988 | Woodward |
| 4,814,626 | A | | 3/1989 | Doemens et al. |
| 4,817,477 | A | * | 4/1989 | Emery et al. ............. 83/210 X |
| 4,841,822 | A | | 6/1989 | Gerber |
| 4,845,373 | A | | 7/1989 | Jamieson et al. |
| 4,856,393 | A | | 8/1989 | Braddon |
| 4,865,533 | A | | 9/1989 | Hart et al. |
| 4,881,711 | A | | 11/1989 | Vollaro |
| 4,926,917 | A | | 5/1990 | Kirbach |
| 4,927,479 | A | | 5/1990 | Böck |
| 4,963,728 | A | | 10/1990 | Hof et al. |
| 4,995,087 | A | | 2/1991 | Rathi et al. |
| 5,023,534 | A | | 6/1991 | Ueda et al. |
| 5,036,574 | A | | 8/1991 | Kakimoto |
| 5,036,723 | A | * | 8/1991 | Matsumoto .............. 74/490.08 |
| 5,036,736 | A | | 8/1991 | Hillock et al. |
| 5,042,341 | A | | 8/1991 | Greten et al. |
| 5,051,219 | A | | 9/1991 | Miller |
| 5,078,820 | A | | 1/1992 | Hamamura et al. |
| 5,079,981 | A | | 1/1992 | Singer et al. |
| 5,098,507 | A | | 3/1992 | Mao |
| 5,137,758 | A | | 8/1992 | Kistner et al. |
| 5,138,667 | A | | 8/1992 | Roch et al. |
| 5,163,759 | A | | 11/1992 | Jambor et al. |
| 5,180,000 | A | | 1/1993 | Wagner et al. |
| 5,201,204 | A | | 4/1993 | Hinterman et al. |
| 5,212,647 | A | | 5/1993 | Raney et al. |
| 5,217,216 | A | | 6/1993 | Smith et al. |
| 5,232,321 | A | | 8/1993 | Suzuki |
| 5,233,152 | A | | 8/1993 | Prokosch et al. |
| 5,241,733 | A | | 9/1993 | Rosen |
| 5,299,444 | A | | 4/1994 | Kirii et al. |
| 5,304,274 | A | | 4/1994 | Crownover et al. |
| 5,304,410 | A | | 4/1994 | Webster |
| 5,315,202 | A | | 5/1994 | LaSota |
| 5,318,820 | A | | 6/1994 | Smith et al. |
| 5,440,214 | A | | 8/1995 | Peeters |
| 5,487,011 | A | | 1/1996 | Chaiken |
| 5,508,936 | A | | 4/1996 | King et al. |
| 5,517,910 | A | | 5/1996 | Skahan |
| 5,523,661 | A | | 6/1996 | Okada et al. |
| 5,528,488 | A | | 6/1996 | Maruyama et al. |
| 5,535,655 | A | | 7/1996 | Kammann |
| 5,566,594 | A | | 10/1996 | Michlin |
| 5,603,147 | A | | 2/1997 | Bischoff et al. |
| 5,623,724 | A | | 4/1997 | Gurkovich et al. |
| 5,644,979 | A | | 7/1997 | Raney |
| 5,794,541 | A | * | 8/1998 | Hirose ................. 74/490.07 X |
| 5,836,080 | A | * | 11/1998 | Inagaki et al. .......... 108/140 X |

OTHER PUBLICATIONS

J.J. Thompson—"Forming Thin Ceramics." *Ceramic Bulletin*, vol. 42(9), pp. 480–481 (1963).

V.F. Capozzi—"Multilayer Ceramic Capacitor Materials and Manufacture." (Oxy Metals Industries Corp., 1975), pp. 73–75.

V.C.S. Prasad—"Thin Ceramics for Electronics." *Transactions of the Indian Ceramic Society*, 47(2), pp. 25–31, 35 (Mar.–Apr. 1988).

R.E. Mistler—"Tape Casting: The Basic Process for Meeting the Needs of the Electronics Industry." *Ceramic Bulletin*, 69(6), pp. 1022–1026 (1990).

*T.P. Hyatt—"Electronics: Tape Casting, Roll compaction."* American Ceramic Society Bulletin, 74(10), pp. 56–59 (Oct. 1995).

* cited by examiner

WEB OR SHEET-FED APPARATUS HAVING HIGH-SPEED MECHANISM FOR SIMULTANEOUS X, Y AND θ REGISTRATION AND METHOD

RELATED APPLICATIONS

This is a continuation of application Ser. No. 08/825,368, filed Mar. 28, 1997, now abandoned, and entitled "Web or Sheet-Fed Apparatus Having High-Speed Mechanism For Simultaneous X, Y and θ Registration and Method."

BACKGROUND OF THE INVENTION

1. Field of the Invention

The present invention is broadly concerned with improved, high speed web or sheet processing apparatus designed for extremely accurate registration and operation upon successive material segments fed to the apparatus. More particularly, the invention pertains to such apparatus, and corresponding methods, which are operable for initially gripping or holding a fed material segment, whereupon the gripped segment is essentially simultaneously shifted along orthogonal axes within the plane of the segment, and about a rotational axis transverse to the segment plane for accurate alignment purposes. The invention is particularly suited for high speed accurate die cutting operations.

2. Description of the Prior Art

Three-axis die cutting presses have been proposed in the past for processing of continuous webs. One such press is disclosed in U.S. Pat. No. 4,555,968. The press of this patent includes a shiftable die unit supported on a cushion of air, and the die unit is moved laterally of the direction of travel of the web as well as rotatably about an upright axis perpendicular to the web in order to bring the die unit into precise registration with the defined areas of the web to the die cut by the press. Automatic operation of the press described in the '968 patent is provided by a control system having two groups of photo-optical sensors which are disposed to detect the presence of two T-shaped marks provided on opposite sides of the web adjacent each defined area to be cut. The control system is electrically coupled to a servo-motor mechanism for adjustably positioning the die unit once advancement of the web is interrupted in a defined area on the web in a general proximity to work structure of the die unit.

As shown in U.S. Pat. No. 4,697,485, a die cutting press is provided with a registration system operable to provide precise alignment of a shiftable die cutting unit along two axes during the time that the web material is advanced along a third axis to the die unit, so that as soon as a defined area of the web reaches the die unit, the press can be immediately actuated to subject the material to the die cutting operation. Continuous monitoring of an elongated indicator strip provided on the material enables the die unit to be shifted as necessary during web travel to ensure lateral and angular registration prior to the time that web advancement is interrupted.

U.S. Pat. No. 5,212,647 describes a die cutting press provided with a registration system that quickly and accurately aligns defined areas of a web with a movable die unit without requiring the use of elaborate or continuous marks or more than two sensing devices for determining the location of the marks relative to the die unit. The registration system of the '647 patent employs a pair of reference indicia fixed on a bolster of the press for indicating the position at which the indicia on the web of material appear when the defined areas of the web are in a desired predetermined relationship relative to the die unit supported on the bolster.

Application for U.S. Letters Patent Ser. No. 08/641,413 filed Apr. 30, 1996, now U.S. Pat. No. 5,644,979, describes an improved die cutting press wherein the entire die unit comprising a lower platen and a shiftable, upper die assembly is supported on a cushion of air. During operation when a defined area of the web is initially fed to the die cutting station, the target area is gripped via a vacuum hold-down and the entire die unit is simultaneous adjusted along three axes so as to achieve precise alignment between the target area on the web and the die cutting assembly.

Although the accuracy provided by such prior art die cutting registration systems is very good, such presses are relatively slow. For example, in the case of the press described in the '413 patent application the necessity of moving the relatively heavy and bulky die assembly tends to slow the operation thereof. The earlier die presses are in general able to operate at speeds no faster than about 20 strokes per minute.

There is accordingly a need in the art for an improved web or sheet-fed processing apparatus, such as a die cutting press, which avoids the problems of prior units of this type and gives very high speed registration and operation.

SUMMARY OF THE INVENTION

The present invention overcomes the problems outlined above and provides an apparatus and method for the processing of successively fed segments (i.e., portions of a continuous web or discreet sheets) so that operations such as die cutting can be rapidly and accurately carried out. Broadly speaking, the apparatus of the invention includes an operating station, means for initially feeding a segment of material into the station, and positioning means for accurately positioning the segment in the station after such initial feeding and prior to processing in the station. The positioning means includes segment gripping or holding means for firmly holding the initially fed segment, means for determining the position of the held segment within the station as compared with a desired position thereof, and motive means coupled with the segment-holding means for moving the latter and the segment held thereby to locate the segment in the desired position. Generally speaking, the material segments carry at least one and preferably a pair of position-identifying indicia, and the positioning means includes a reference assembly providing reference data corresponding to the desired position for the segment indicia, together with means for comparing the location of the segment indicia with the reference data.

In another aspect of the invention, an apparatus and method for processing of individual segments of a continuous flexible web is provided wherein accurate adjustment of the position of successively fed web segments is provided by initially holding each successive segment and subjecting the held segment to adjusting motion while the segment remains a part of a continuous web. This adjusting motion is selected from the group consisting of motion along either or both of orthogonal axes in the plane of the segment and rotational motion of the segment about an axis transverse to segment plane, and combinations of the foregoing motions. It is to be understood that the invention provides such three-axis movement of individually held web segments while the respective segments remain a part of the continuous web.

In preferred forms, the web gripping or holding apparatus of the invention includes a relatively lightweight vacuum hold-down plate within the web or sheet processing station.

In the case of a die cutting press, the vacuum hold-down plate is in the form of a centrally apertured body surrounding an essentially stationary floating die cutting anvil; the vacuum plate is shiftable as necessary in an axial direction (i.e., in the direction of web travel), a lateral direction (transverse to the axial direction), and/or rotationally about an upright rotational axis perpendicular to the axial and lateral directions and to a plane containing the segments. As used herein "die cutting" refers broadly to encompass various operations including but not limited to stamping, cutting, punching, piercing, blanking, and other similar operations.

The preferred motive means is coupled directly to the vacuum plate and includes a plurality of spaced apart motors such as bi-directional stepper motors, each of the later being translatable during movement of the vacuum hold-down plate. In order to achieve the most accurate and rapid plate movement, the motors are coupled via eccentrics to the plate so that operation of the motors will drive and move the plate as required. In the most preferred form, the motive means includes three such eccentrically coupled stepper motors, with the axes of the plate-connecting shafts lying in a single, common rectilinear line.

The preferred positioning apparatus also makes use of a pair of CCD (charge coupled device) cameras mounted within the processing station, together with a pair of split prisms and fixed reference indices carried by the die assembly. In operation, when a material segment is fed to the processing station, each camera receives a combined image made up of an image of the fixed indicia as well as one of the fiducials carried by the material segment. This image data is then used to calculate registration error and distance of travel information which is in turn employed in the operation of the respective stepper motors, so as to move the vacuum plate and the material segment held thereby for accurate positioning of the segments.

The apparatus of the invention is similar to that described in U.S. Pat. Nos. 4,555,968; 4,697,485; 5,212,647 and pending application Ser. No. 08/641,41-3, all of which are incorporated by reference herein.

DETAILED DESCRIPTION OF THE PREFERRED EMBODIMENT

Figure 1:
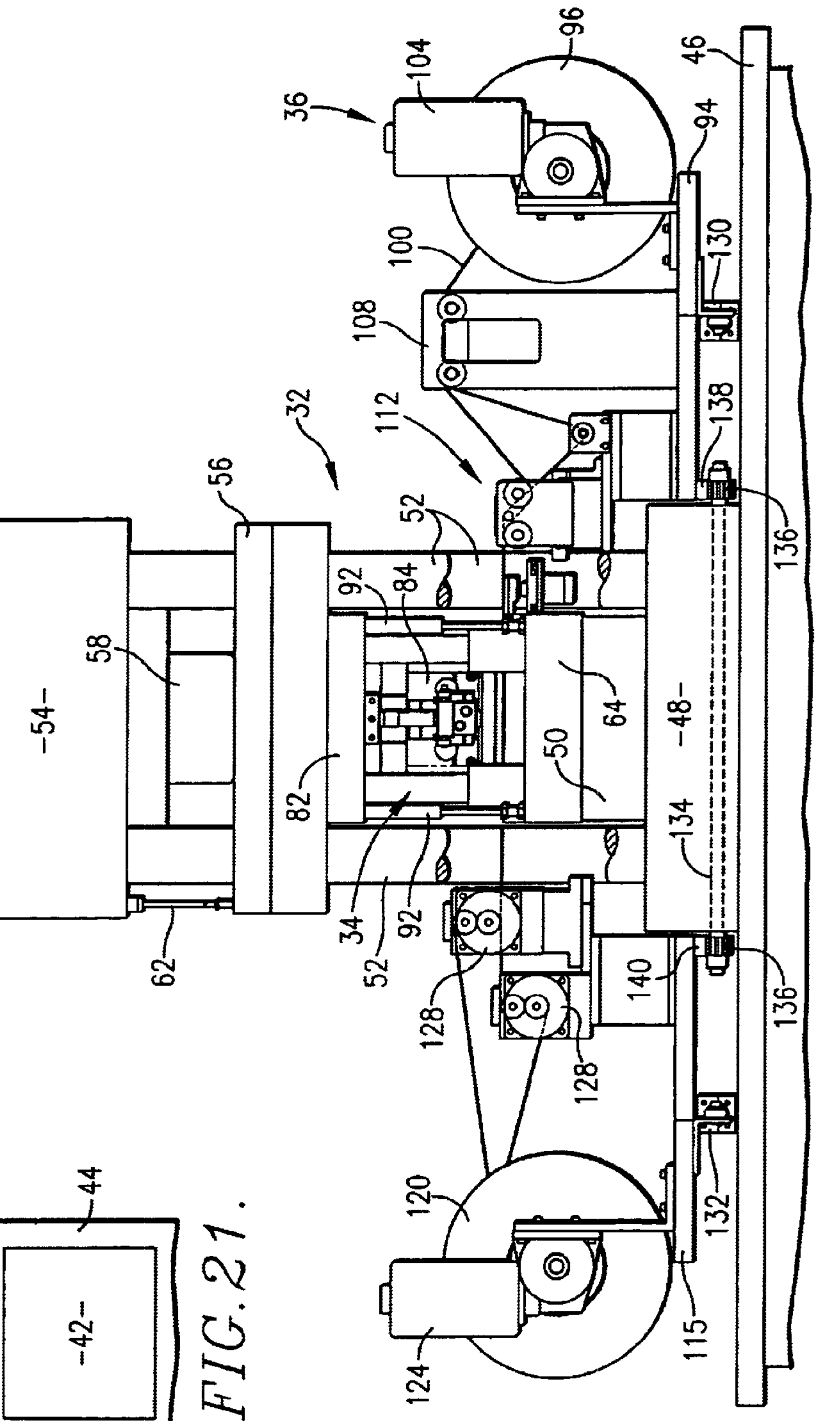
FIG. 1 is a side elevational view of the preferred web fed die cutting apparatus in accordance with the invention.
Figure 21:
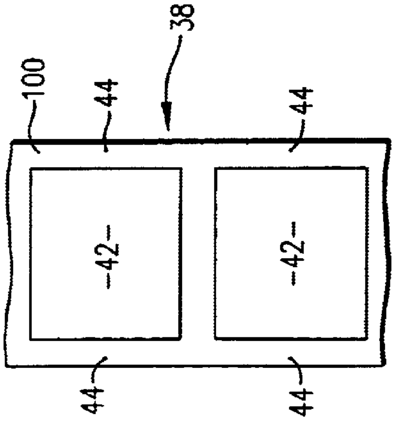
FIG. 21 is a fragmentary top view of a continuous web illustrating respective web segments along the length thereof, together with position-indicating fiducial for each such segment.

Turning now to the drawings, and particularly FIG. 1, die cutting apparatus 30 is illustrated. The apparatus 30 broadly includes a die cutting press or station 32 equipped with a die set 34, a material feeder assembly 36 for sequentially feeding stock to the station 32 for sequential die cutting of segments 38 thereof (FIG. 21), and segment positioning apparatus 40 adjacent die set 34 for accurate positioning of each respective segments 38 relative to the die set.

The assembly 30 is adapted for use in processing elongated webs which present successive segments 38 having target die-cutting regions 42 thereon and carrying imprinted indicia such as fiducials 44 (FIG. 21), the latter being in predetermined positions relative to the corresponding target regions. An example of material capable of being processed in assembly 30 is a flexible synthetic resin web. The die cutting of such material as a part of production of many devices may be highly critical and extremely close cutting tolerances are required. The assembly 30 is thus designed for high speed yet very accurate die cutting of the successive segments 38.

In more detail, the station 32 includes a base 46 supporting a central, upstanding, generally rectangular platen 48 and spacer 50. Four upstanding rods 52 are supported on platen 48 and support adjacent the upper ends thereof an upper frame member 54. A ram platen 56 is reciprocally carried by the rods 52 below frame member 54 and is vertically shiftable by means of piston 58. A micrometer unit 60 is mounted atop frame member 54 and permits selective adjustment of the extent of vertical shifting of ram platen 56, and a sensing mechanism 62 such as a glass scale supported between the member 54 and platen 56 for providing feedback to a controller regarding the vertical position of the platen 56.

Figure 3:
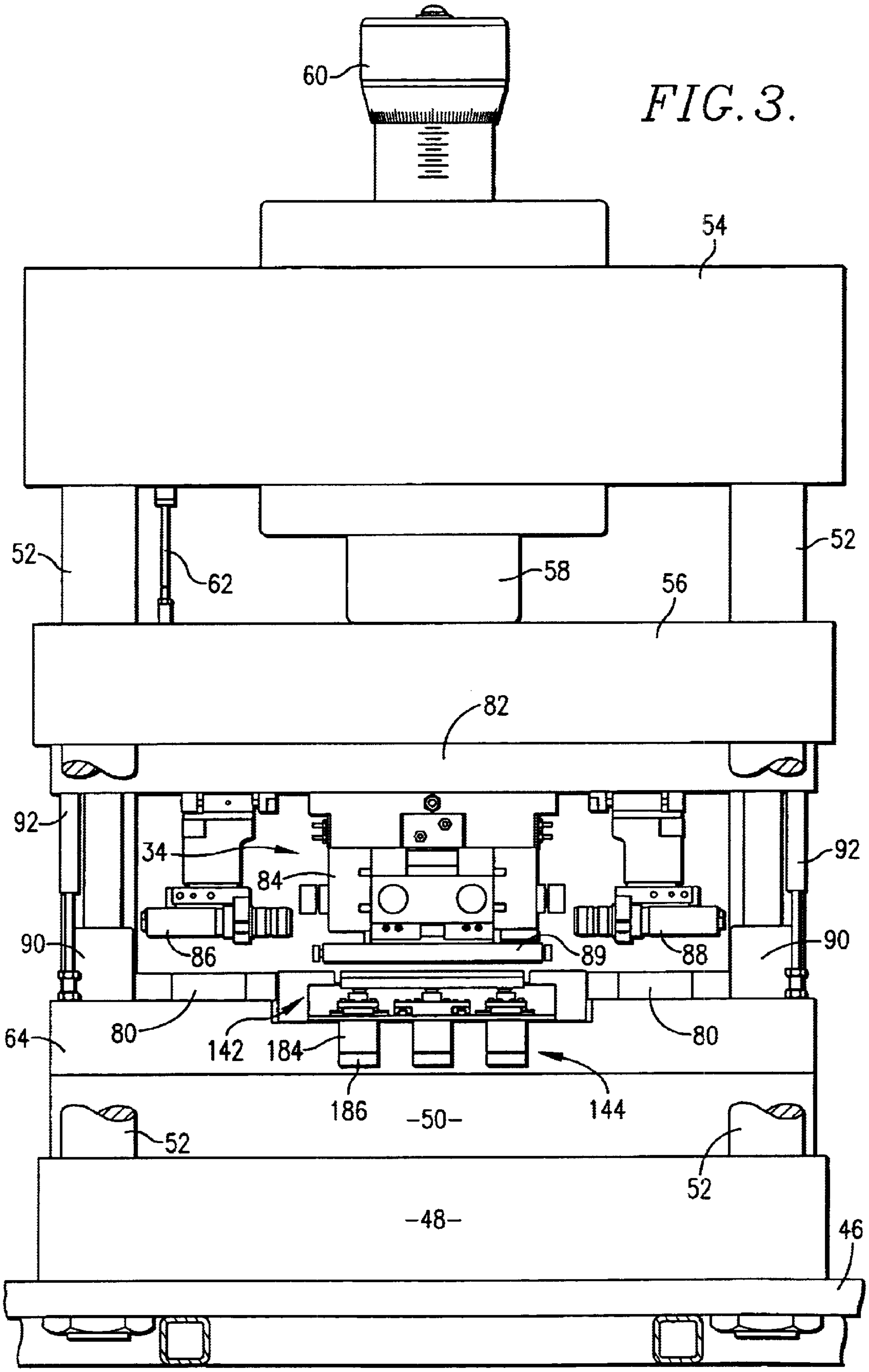
FIG. 3 is a vertical sectional view with parts broken away for clarity illustrating the input end of the die cutting station forming a part of the apparatus illustrated in FIGS. 1–2.
Figure 6:
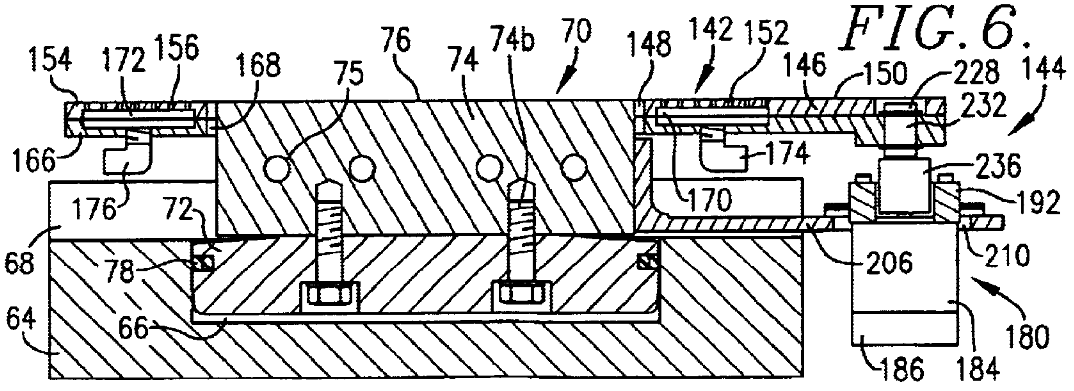
FIG. 6 is a sectional view taken along line 6—6 of FIG. 4 which illustrates the internal construction of the plate and anvil assembly.

As best seen in FIGS. 3 and 6, the die set 34 includes a bolster 64 supported on spacer 50 with a central piston-receiving recess 66 therein as well as a relatively wide, fore and aft extending slot 68. An anvil assembly 70 is supported on bolster 64 between the upstanding sidewalls of slot 68. The anvil assembly 70 includes a lowermost piston 72 adapted to fit within recess 66 (FIG. 6), as well as an upper anvil block 74; the piston 72 is secured to block 74 via bolts **74*b*. The block 74 presents a planar uppermost anvil face 76 and a pair of relatively narrow, elongated fore and aft extending slots 74*a* astride surface 76. The block 74 is also provided with four transverse openings 75 therethrough adapted for the receipt of electrical heating elements. Piston 72 is equipped with a circumferential seal 78 and a supply of leveling media or material is provided in recess 66; the piston 72 and thus the anvil assembly 70 is thus resiliently supported. A pair of alignment blocks 80 are positioned atop bolster 64 on either side of slot 68 and engage opposed sidewall surfaces of block 74**.

The die set 34 also includes an upper fixture-supporting plate 82 which is disposed beneath platen 56. The plate 82 supports a central cutting die assembly 84 disposed above anvil surface 76 as well as a pair of positioning CCD cameras 86, 88 and other structure associated with positioning apparatus 40 later to be described. The assembly 84 includes a die unit 89 which contacts the underlying anvil assembly 70 during each stroke of the die assembly 84.

A total of four telescoping guide units 90 are positioned between and operably coupled to plate 82 and bolster 64 to assist in guiding the up and down reciprocal movement of plate 82 and thus die unit 84. One such spring biased cylinder 92 is positioned adjacent each unit 90 and are biased to normally hold unit 84 above anvil surface 76.

Figure 2:
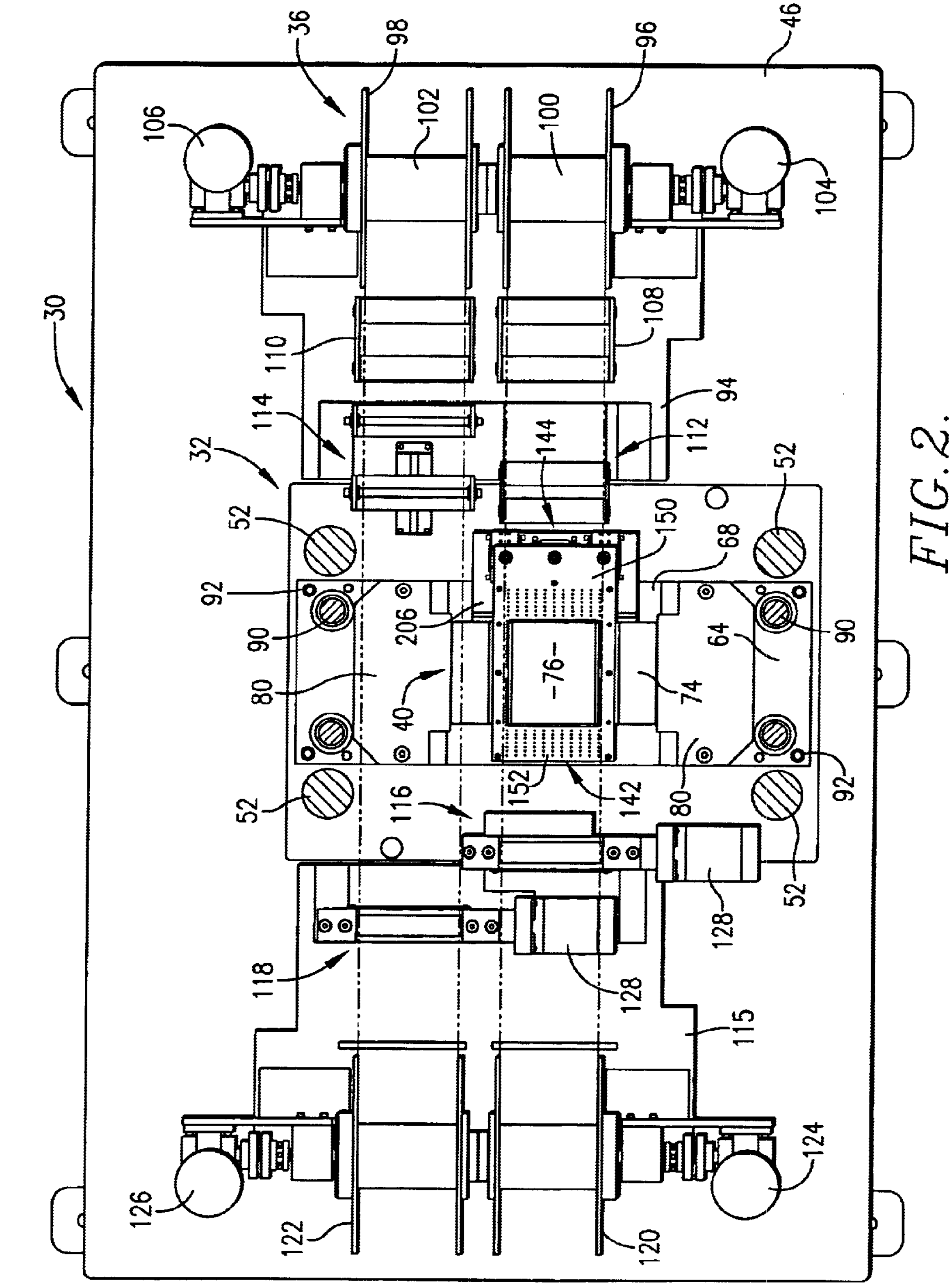
FIG. 2 is a plan view of the apparatus illustrated in FIG. 1, and illustrating in detail the feeding assembly and shiftable web-holding adjustment plate thereof.

As best seen in FIGS. 1 and 2, the upstream or input end of assembly 36 is supported on a shiftable carriage 94 for movement thereof in a direction transverse to the path of travel of web material through the station 32. In this fashion, either one of two webs later to be described can be positioned relative to die set 34 for processing. The assembly 36 broadly includes a pair of side-by-side supply reels 96, 98 supporting first and second webs 100, 102 of stock material, with motors 104, 106 serving to drive the reels 96, 98. The overall assembly 36 further has vacuum tensioning assemblies 108, 110 and guide roller sets 112, 114 for guiding the webs through the station 32. As will be evident to those skilled in the art, the supply reels 96, 98 are driven by the associated motors 104, 106 to unwind the webs 100, 102 so that stock material is can be fed through the station 32 for die cutting thereof. The vacuum tensioning assemblies 108, 110 maintain a predetermined tension on the webs during feeding thereof while the guide roller sets 112, 114 guide the webs into the station 32; these components are set so as to allow slight adjusting movement of web segments within the station 32 as later described.

The assembly 36 also provides takeup for the remainders of the die cut webs 100, 102 upon processing thereof in station 32, and to this end includes a shiftable carriage 115 supporting output drive roller sets 116, 118 and takeup reels 120, 122, the latter being powered by motors 124, 126. A stepper motor 128 is provided for driving each set of drive rollers 116, 118 and function as a coarse feed means for quickly advancing either web 100 or 102 along a path of travel to successively feed defined segments 38 toward and into station 32.

A pair of air cylinders 130, 132 are provided for respectively moving the carriages 94, 115 between a first position in which web 100 is aligned with station 32 and die set 34, and a second position in which web 102 is similarly aligned. A pair of rotatable shafts 134 extend through platen 48 in a direction parallel to the path of travel of the webs 100, 102, with each shaft 134 presenting a pair of opposed axial ends that extend beyond platen 48. A pinion gear 136 is secured on each end of the shafts 134 so that rotation of either pinion on each shaft is transmitted to the other pinion on the opposite side of the base platen. A rack gear 138, 140 is supported on the underside of each carriage 94, 115 in engagement with the proximal pinion gears so that each carriage moves in alignment with the other upon actuation of the cylinders 130, 132.

The positioning apparatus 40 is located adjacent anvil block 74 and is in surrounding relationship to surface 76. The apparatus 40 broadly includes a vacuum plate element 142 as well as a motive assembly 144 operatively coupled to the element 142. The purpose of apparatus 40 is to provide a fine and accurate adjustment of the position of each segment 38 within station 32 so that the target region 42 thereof is accurately die cut.

The vacuum plate 142 includes an uppermost plate 146 presenting a central, substantially square opening 148 adapted to receive the central portion of block 74 and thus expose surface 76. The plate 142 includes a forward portion 150 provided with a series of vacuum apertures 152 therein together with a spaced, opposed rearward portion 154 likewise having vacuum apertures 156 therethrough. The portions 150, 154 are interconnected by side marginal portions 158, 160 each provided with vacuum apertures 162, 164.

The overall plate 142 further includes a lower plate element 166 likewise having an opening 168 therein in registry with opening 148; the lower plate 166 is secured to upper plate 146 by fasteners 147. As best seen in FIG. 6, elongated, internal plenums 170, 172 are provided between the plates 146 and 166. Individual vacuum line couplers 174, 176 are operatively connected to the lower plate 166 in communication with the corresponding plenums 170, 172 for connection to a selectively operable vacuum system (not shown). These plenums are, via appropriate internal passageways, in communication with the vacuum apertures 152, 156, 162 and 164. Again referring to FIG. 6, it will be observed that the aligned openings 148, 168 in the upper and lower plates 146, 166 are dimensioned to be somewhat larger than the adjacent block 74; the importance of this feature will be made clear hereinafter.

Figure 8:
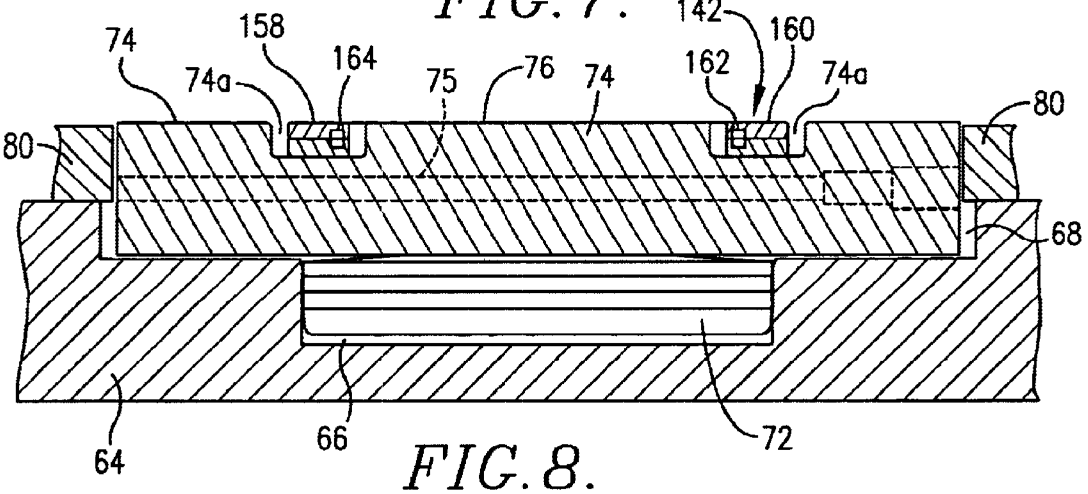
FIG. 8 is a sectional view taken along line 8—8 of FIG. 4 which illustrates the side panel members of the shiftable plate and the underlying anvil assembly.

The vacuum plate 142 is supported for limited simultaneous axial, lateral and rotational movement thereof by receipt of the side marginal portions 158, 160 in the respective anvil block slots **74*a* (see FIG. 8). It will again be observed that the slots 74*a* are dimensioned to be somewhat wider than the associated side marginal portions 158, 160, so as to accommodate limited shifting movement of the vacuum plate 142**.

Figure 4:
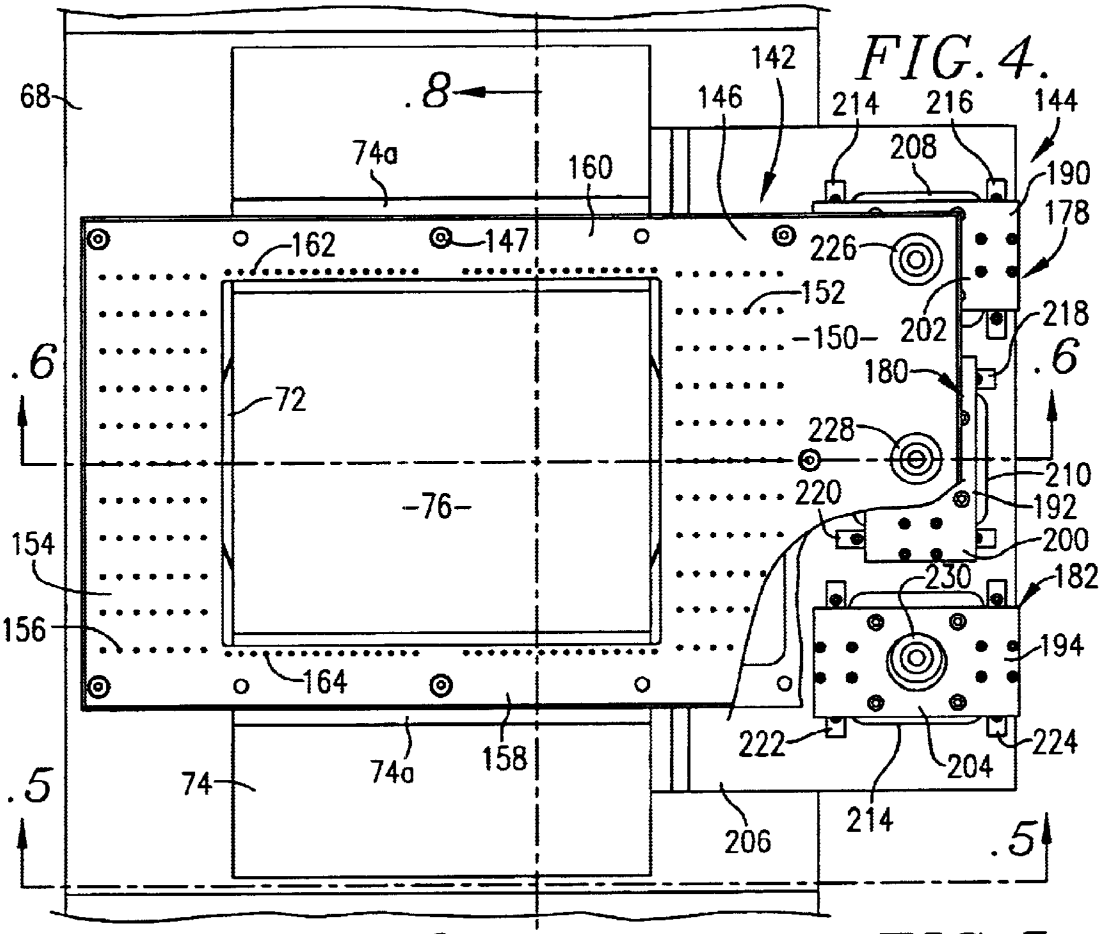
FIG. 4 is fragmentary view with parts broken way for clarity of the shiftable segment-holding vacuum plate assembly of the invention.
Figure 5:
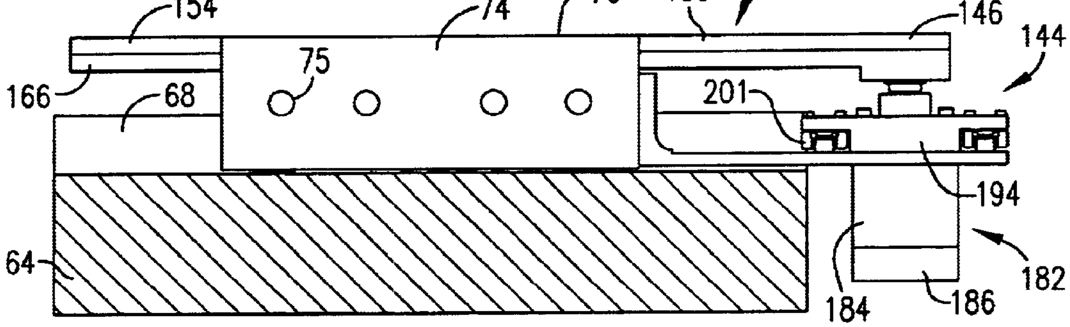
FIG. 5 is a sectional view taken along line 5—5 of FIG. 4 and further depicting the construction of the shiftable plate and anvil assembly.
Figure 7:
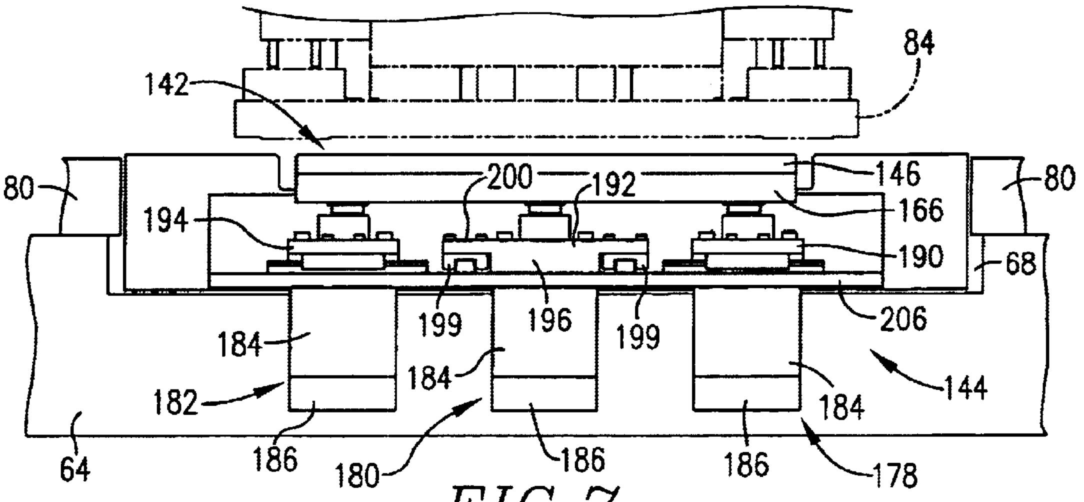
FIG. 7 is a fragmentary view depicting the input end of the plate and anvil assembly, with the cooper able die assembly illustrated in phantom.
Figure 9:
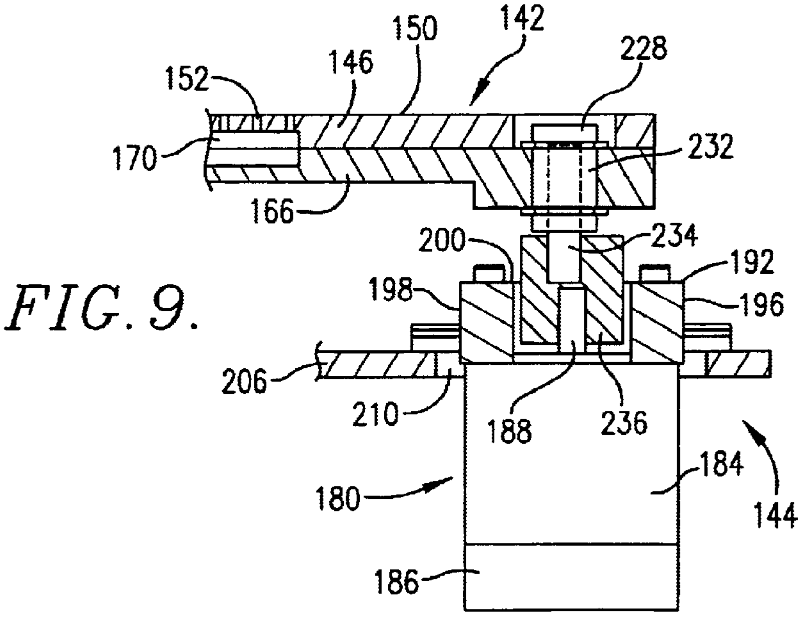
FIG. 9 is an enlarged, fragmentary in partial vertical section which illustrates one of the eccentric drive motor units coupled with the shiftable segment-holding plate.

The motive assembly 144 comprises three stepper motor units 178, 180, 182 each secured to the forward end of vacuum plate 142 (see FIG. 4). The units 178–182 are respectively referred to as the X1, Y and X2 units. Each of the units 178–182 includes an electrically powered bidirectional stepper motor 184 equipped with an encoder 186 and having a rotatable output shaft 188. In addition, each motor has a centrally apertured carriage 190, 192 or 194 secured to the upper end of each stepper motor 184. Referring to FIGS. 7 and 9, it will be seen that the carriage 192 is an elongated, centrally apertured integral block member and has generally T-shaped side surfaces 196, 198, with the block longitudinal axis oriented in a perpendicular transverse relation relative to the fore and aft web direction through station 32. Depending, end marginal yoke bearings 199 are supported adjacent the extreme ends of the carriage 192. In addition, the carriage 192 has a centrally apertured top surface 200. In a similar fashion, the carriages 190 and 194 have spaced, somewhat T-shaped side surfaces and corresponding top surfaces 202 and 204; these carriages also have endmost yoke bearings 201 (see FIG. 5). In the case of carriages 190 and 194 however, the longitudinal axes thereof are oriented transverse to surfaces 196, 198, i.e., they are in alignment with the fore and aft web direction through station 32.

The units 178–182 are supported beneath vacuum plate 142 for limited translatory movement thereof during movement of plate 142. Specifically, the units 178–182 are mounted on a transverse, somewhat L-shaped mounting rail 206 having three laterally spaced apart unit-receiving openings 208, 210 and 212 respectively receiving the stepper motor 184 of each unit 178–182, respectively. The upper surface of rail 206 adjacent each of the openings 208–212 is provided with a pair of spaced apart rails or unit guides for each associated unit. That is, unit guides 214, 216 are located astride opening 208 and oriented transverse to the fore and aft direction through station 32; unit guides 218, 220 are provided adjacent opening 210 and are oriented in alignment with the fore and aft direction; and unit guides 222, 224 are provided adjacent opening 212 in parallel with the guides 214, 216. The yoke bearings 201 forming a part of the carriages 190 and 194 receive the unit guides 214, 216 and 222, 224 respectively. Similarly, the yoke bearings 199 forming a part of carriage 192 receive the unit guides 218, 220. In this fashion, each of the units 178–182 is translatable to a limited degree within the associated rail openings 208–212.

The units 178–182 are coupled to vacuum plate 142 by means of identical, respective eccentric coupling assemblies 226, 228, 230. These assemblies each include a fixed pin connector 232 secured to vacuum plate 142 above each underlying unit 178–182. Each such connector includes a depending pin 234 as best seen in FIG. 9. Connection between the individual stepper motor output shafts 188 and the associated pins 234 is accomplished by provision of eccentric blocks 236, again best shown in FIG. 9. The center-to-center distance between the pins 234 and 188 for each unit 178–182 defines the crank arm length for that unit.

Figure 10:
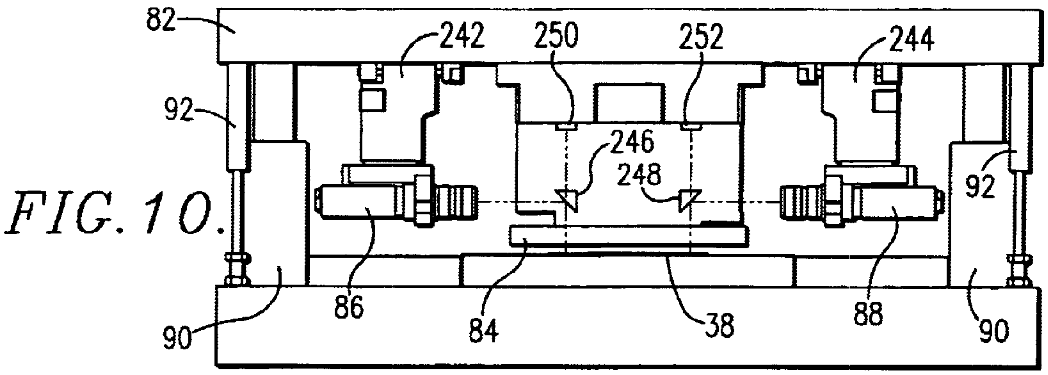
FIG. 10 is a schematic view of the die cutting station illustrating the orientation of the CCD cameras and the associated prisms used to sense web segment position.

The overall positioning apparatus 40 also includes the aforementioned CCD cameras 86, 88 which are supported on mounts 242, 244 depending from plate 82 (FIG. 10). The cameras 86, 88 are provided with associated prisms 246, 248 mounted on die set 34, the latter also including fixed positional indicia 250, 252. Preferably, each indicium 250, 252 includes a closed line forming a square, wherein the open area of the square corresponds to the size of one of the fiducial indicia 44 on each segment 38. For example, where solid, circular fiducials are printed on web, the reference indicia 250, 252 would include a square having an inner area equal in width and height to the diameter of the circular fiducials. A clear line of sight extends between each reference indicium 250, 252 and the desired location of the corresponding indicium 44, with an associated split prism 246 or 248 along the line of sight. The images projected along the line of sight from above and below the split prism are both reflected laterally as a single compound image within which both the reference indicium and the fiducial indicium on the web are visible. The cameras 86, 88 are thus aligned vertically with an associated split prism 246, 248 so that each camera receives the compound image reflected by the prism. By way of example, each CCD camera may be provided with a two-dimensional array made up of 512×489 pixels and outputs analog signals representative of the image. These signals are converted to digital data by conventional analog-to-digital conversion mechanism. Lenses forming a part of each CCD camera are also provided for focusing the camera on the corresponding split prism. Preferably, the lenses focus the array on an area of about ⅙ of an inch square to provide the desired resolution for registering the die unit and target area 42 of each segment 38 to within about 2/10,000ths of an inch.

Figure 11:
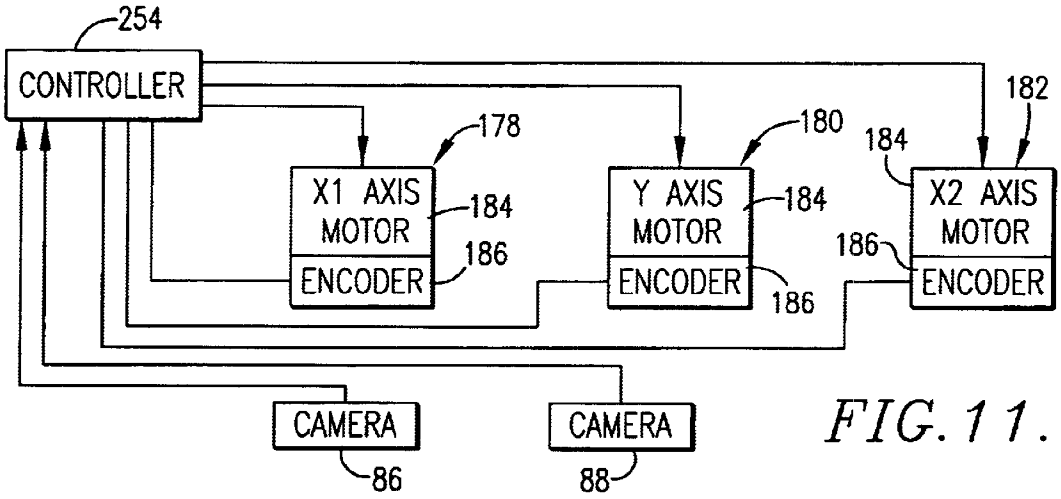
FIG. 11 is a schematic block diagram illustrating th interconnection between the computer controller of the die cutting apparatus and the sensing cameras and stepper motor drive units.

As illustrated in schematic FIG. 11, a computer controller 254 is provided as a part of the apparatus 40, which would typically include a central processing unit, an input device, display means and a memory for storing data and suitable software. As shown, the cameras 86, 88 are coupled to the controller, which also has connections to the stepper motor units 178–182. In addition, the controller 254 is connected to the reel motors 104, 106 and 124, 126, tensioning units 108, 110, 116 and 118 and stepper motors 128 for controlling the webs 100, 102. Broadly speaking, once a given segment 38 is initially and coarsely positioned within station 32 by appropriate actuation of feeder assembly 36 to move the web 100 or 102 a predetermined axial distance, the vacuum system associated with the plate 142 is actuated to firmly grip the segment 38 to the plate 142. The appropriate downstream takeup reel motor 124 or 126 and the associated drive roller sets 116, 118 are then reversed to slightly slacken the web 100 or 102 downstream of the station, thus reducing the web tension. This feature, together with the settings of the upstream web tensioning units 108, 110 allowing slight web movement, together permit web segment adjustment along the orthogonal X and Y axes, and web rotation, without fear of splitting or tearing the web.

The cameras 86, 88 are next actuated to generate image data. The controller 254 receives such image data from the cameras 86, 88 and compares the relative positions of the reference indicia 250, 252 and the indicia 44 for the segment 38 and generates appropriate error data representative of the difference between the actual X, Y and θ positions of the indicia 44 and their desired positions as represented by the reference indicia 250, 252. The position of plate 142 is also known via the encoders 186 of each stepper motor 184. The difference data is then used by the controller in the manner to be described to selectively energize the units 178–182 to change the position of the vacuum plate 142 and thus the segment 38 until the indicia 44 are aligned (within preselected tolerances) with the associated reference indicia. For course, the adjustment of the segment 38 occurs while the segment remains a part of the web, the latter accommodating the slight degree of adjustment required owing to the described web slackening. At this point, die cutting can be commenced in the usual way by lowering of the upper die-carrying portion of die set 34 into cutting contact with the segment 38. After such cutting, the assembly 36 is actuated to move the next segment 38 into station 32, where the process is repeated.

The controller 254 also employs the calculated difference between the actual axial or longitudinal distance between fiducials 44 and the indicia 250, 252 to control the feeding assembly 36. That is, after each segment feeding operation, the axial distance of the web feeding for the next operation of assembly 36 is varied to compensate for the determined axial distance error. In this way, initial web feeding is controlled to prevent inaccuracies in the initial feeding step from accumulating to a point where successive segments 38 would no longer be brought into a sufficiently close alignment so that the cameras 86, 88 could simultaneously view an image including the fixed indicia 250, 252 and fiducials 44. The controller 254 thus controls the operation of the motors of drive assembly 36 in response to the axial difference data calculated during the preceding operational sequence.

Figure 18:
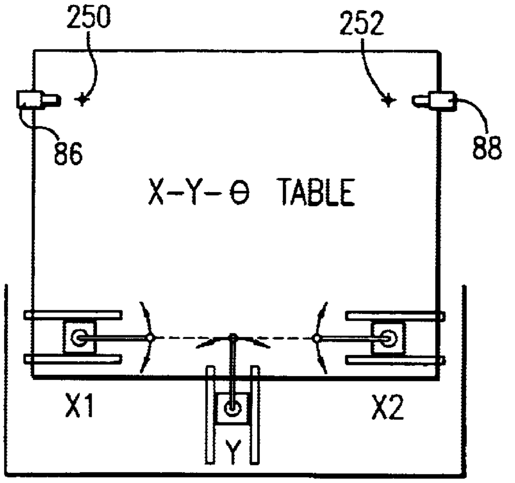
FIG. 18 is a schematic plan view of the X-Y-θ table and interconnected X1, X2 and Y axis drive units of the invention.
Figure 19:
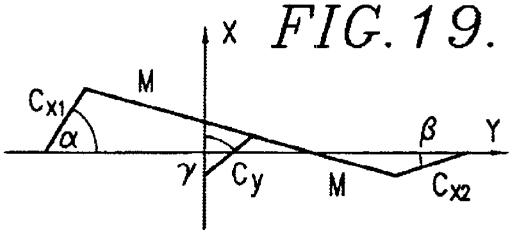
FIG. 19 is a schematic representation of certain geometrical relationships of the X1, X2 and Y drive units used in the development of the preferred control algorithm of the invention.

In order to better understand the method and algorithm by which the vacuum plate 142 is adjusted in order to insure accurate alignment of each respective segment 38 in station 32, attention is directed to FIGS. 18 and 19, which are, respectively, a schematic representation of an X-Y-θ table representative of vacuum plate 142, and a schematic representation showing movements of the respective drive units 178–182. In these Figures, the symbols have the following definitions:

X1=drive unit 178;

Y=drive unit 180;

X2=drive unit 182;

T=distance between fiducials;

$C_{x1}$=the radial eccentric or crank length of drive unit X1 (drive unit 178);

$C_y$=the radial eccentric or crank length of drive unit Y (drive unit 180);

$C_{x2}$=the radial eccentric or crank length of drive unit X2 (drive unit 182);

α=the angle between the Y axis and the drive unit X1 crank length;

γ=the angle between the X axis and the drive unit Y crank length;

β=the angle between the Y axis and the drive unit X2 crank length; and

M=the length between the axes of the plate pins 234.

As is evident from these Figures, the X-Y-θ table (i.e., vacuum plate 142) is attached via the three pins 234 through radial eccentric lengths or crank arms $C_{x1}$, $C_y$ and $C_{x2}$ which are driven by the corresponding stepper motors. The units X1 and X2 slide along the Y axis, whereas unit Y slides along the orthogonal X axis. The central axes of all of the pins 234 lie on a common rectilinear line, with the three pins preferably being equidistantly spaced. Units X1 and X2 have the same crank length, but the crank length $C_y$ can be different.

There are two types of motion associated with each crank: active rotation of the motor shafts 188 which, through the effective crank arms of the eccentrics 236, move vacuum plate 142; and passive translation (sliding) of the individual drive units to accommodate such plate movement. To achieve translation of the table or plate 142 along the X axis, the crank arms associated with units X1 and X2 rotate in opposite directions (one clockwise, the other counterclockwise or vice versa), while the Y unit slides up or down. Table rotation (about an axis transverse to the plane of the segment) is effected by rotating both of the X1 and X2 crank arms in the same direction (clockwise for table counterclockwise or counterclockwise for table clockwise) without any translation of the Y unit. Translation of the table or plate 142 along the Y axis is obtained by rotation of the Y crank arm with both the X1 and X2 units sliding left or right together. Any time the X1 or X2 crank arms rotate away from the Y axis, the X1 or X2 drive units slide inward; any time the X1 or X2 crank arms rotate toward the Y axis, the X1 or X2 drive units slide outward. If the Y crank arm rotates away from the Y axis, the Y unit slides up; if the Y crank arm rotates towards the X axis, the Y unit slides down. Since the system is nonlinear, for the same amount of table translation or rotation, the amount of each individual crank arm movement will be different at different crank angles. For the same reason, for a single translation along the X axis or table rotation, the rotation of the X1 and X2 crank arms are not necessarily the same amount, but depend upon the crank angles.

Referring specifically to FIG. 19, it will be seen that at any given time, the following holds:

$$2M\sin\theta = C_x(\sin\alpha + \sin\beta) \tag{1}$$

$$Y = C_y \sin\gamma \tag{2}$$

1. For a pure T rotation (pivoting at the center pin) with (+) Δθ

$$C_x(\sin\alpha_2 - \sin\alpha_1) = M(\sin\theta_2 - \sin\theta_1)$$

therefore $$\sin\alpha_2 = \frac{M}{C_x}(\sin\theta_2 - \sin\theta_1) + \sin\alpha_1$$

From (1) we have $$\sin\theta_1 = \frac{C_x}{M}\frac{\sin\alpha_1 + \sin\beta_1}{2} \tag{3}$$

and $$\theta_1 = \sin^{-1}\left(\frac{C_x}{M}\frac{\sin\alpha_1 + \sin\beta_1}{2}\right) \tag{4}$$

upon given Δθ and using (3) and (4)

$$\begin{aligned}\alpha_2 &= \sin^{-1}\bigg(\frac{M}{C_x}(\sin(\theta_1 + \Delta\theta) - \sin\theta_1) + \sin\alpha_1\bigg) \\ &= \sin^{-1}\bigg(\frac{M}{C_x}\bigg(\sin\bigg(\sin^{-1}\bigg(\frac{C_x}{M}\frac{\sin\alpha_1 + \sin\beta_1}{2}\bigg) + \Delta\theta\bigg) - \\ &\qquad \frac{C_x}{M}\sin\alpha_1 + \frac{\sin\beta_1}{2}\bigg) + \sin\alpha_1\bigg)\end{aligned} \tag{5}$$

Similarly, $$\begin{aligned}&= \sin^{-1}\bigg(\frac{M}{C_x}\bigg(\sin\bigg(\sin^{-1}\bigg(\frac{C_x}{M}\frac{\sin\alpha_1 + \beta_1}{2}\bigg) + \Delta\theta\bigg) - \\ &\qquad \frac{C_x}{M}\frac{\sin\alpha_1 + \sin\beta_1}{2}\bigg) + \sin\beta_1\bigg)\end{aligned}$$

$$\beta_2 = \sin^{-1}\bigg(\frac{M}{C_x}(\sin(\theta_1 + \Delta\theta) - \sin\theta_1) + \sin\beta_1 \tag{6}$$

2. For a pure X translation with (+)Δx, from (1)

$$\sin\alpha_1 + \sin\beta_1 = \sin\alpha_2 + \sin\beta_2 \tag{7}$$

$$\because C_x\sin\alpha_2 = C_x\sin\alpha_1 + \Delta x$$

$$\therefore \sin\alpha_2 = \sin\alpha_1 + \frac{\Delta x}{C_x} \text{ and} \tag{8}$$

$$\alpha_2 = \sin^{-1}\left(\sin\alpha_1 + \frac{\Delta x}{C_x}\right) \tag{9}$$

Similarly, $$\sin\beta_2 = \sin\beta_1 - \frac{\Delta x}{C_x} \text{ and} \tag{10}$$

$$\beta_2 = \sin^{-1}\left(\sin\beta_1 - \frac{\Delta x}{C_x}\right) \tag{11}$$

Substituting sin $\beta_2$ in (7) with that of in (10), (8) can also be obtained.

3. For a pure Y translation with (+) $\Delta y$, from (2) we have $$\gamma_2 = \sin^{-1}\left(\sin\gamma_1 + \frac{\Delta y}{C_y}\right) \tag{12}$$

4. Composite Move

From (1), (2), (9), (11) and (12), it is seen that Y movement is independent of X-T movement; therefore the following discusses an X-T move only.

Assume initial position $\alpha_0$, $\beta_0$, desired translation $\Delta x$ and rotation $\Delta\theta$, resulting position $\alpha_2$, $\beta_2$.

Even though it is a non-linear system, a simultaneous, 3-axis movement can be obtained if the following is established:

a. $\Delta x$ first, arrived at $\alpha_1$, $\theta_1$, then $\Delta\theta$, from (5) and (8) giving $$\begin{aligned}\sin\alpha_2 &= \frac{M}{C_x}(\sin(\theta_1 + \Delta\theta) - \sin\theta_1) + \sin\alpha_1 \\ &= \frac{M}{C_x}(\sin(\theta_0 + \Delta\theta) - \sin\theta_0) + \sin\alpha_0 + \frac{\Delta x}{C_x}\end{aligned} \tag{14}$$

From (3) or (4), (14) can be written as $$f(\alpha_2) = f_x(\alpha_0, \beta_0, \Delta x) + f_0(\alpha_0, \beta_0, \Delta\theta) + \text{Const} \tag{15}$$

here $$f_x = \frac{\Delta x}{C_x} \tag{16}$$

$$f_x = \frac{\Delta x}{C_x} \tag{17}$$

$$f_0 = \frac{M}{C_x}(\sin(\theta_0 + \Delta\theta) - \sin\theta_0) \tag{18}$$

$$\text{Const} = \sin\alpha_0 \tag{19}$$

b. $\Delta\theta$ first, arrived at $\alpha_1$, $\theta_1$, then $\Delta x$, from (8) and (5) giving $$\begin{aligned}\sin\alpha_2 &= \sin\alpha_1 + \frac{\Delta x}{C_x} \\ &= \frac{M}{C_x}(\sin(\theta_0 + \Delta\theta) - \sin\theta_0) + \sin\alpha_0 + \frac{\Delta x}{C_x}\end{aligned} \tag{20}$$

(14), (15) and (20) shows the independence of the move sequence.

From (3), (4) and (18) giving $$\frac{M}{C_x}(\sin(\theta_0 + \Delta\theta) - \sin\theta_0) = \frac{M}{C_x}\left(\sin\left(\sin^{-1}\left(\frac{C_x}{M}\frac{\sin\alpha_0 + \sin\beta_0}{2}\right) + \Delta\theta\right) - \frac{C_x}{m}\frac{\sin\alpha_0 + \sin\beta_0}{2}\right)$$

Thus, the following motion equations are derived:

$$\alpha_2 = \sin^{-1}(f_x + f_\theta + \sin\alpha_0) \tag{21}$$

$$\beta_2 = \sin^{-1}(-f_x + f_\theta + \sin\beta_0) \tag{22}$$

$$\gamma_2 = \sin^{-1}(f_y + \sin\gamma_0) \tag{23}$$

here $$f_x = \frac{\Delta x}{C_x} \tag{24}$$

$$f_y = \frac{\Delta y}{C_y} \tag{25}$$

$$f_\theta = \frac{M}{C_x}(\sin(\sin^{-1}\varphi + \Delta\theta) - \varphi) \tag{26}$$

with $$\varphi = \frac{C_x}{M}\frac{\sin\alpha_0 + \sin\beta_0}{2} \tag{27}$$

5. Determination of $\Delta X$, $\Delta Y$ and $\Delta\theta$.

The position differences in camera 86 and camera 88 can be translated into physical error.

The coordinate system rotation transformation is $$\begin{bmatrix} x' \\ y' \end{bmatrix} = \begin{bmatrix} \cos\Theta & \sin\Theta \\ -\sin\Theta & \cos\Theta \end{bmatrix}\begin{bmatrix} x \\ y \end{bmatrix}$$

So the increment equation can be derived as $$\begin{bmatrix} \Delta X_i \\ \Delta Y_i \end{bmatrix} = \begin{bmatrix} Kx_i & 0 \\ 0 & Ky_i \end{bmatrix}\begin{bmatrix} \cos\Theta_i & \sin\Theta_i \\ -\sin\Theta_i & \cos\Theta_i \end{bmatrix}\begin{bmatrix} \Delta x_i \\ \Delta y_i \end{bmatrix} = \begin{bmatrix} a_i & b_i \\ -c_i & d_i \end{bmatrix}\begin{bmatrix} \Delta x_i \\ \Delta y_i \end{bmatrix} \tag{28}$$

here $$Kx_i = \frac{Cali\Delta X_i}{\Delta x_i \cos\Theta + \Delta y_i \sin\Theta} \tag{29}$$

$$Ky_i = \frac{Cali\Delta Y_i}{-\Delta x_i \sin\Theta + \Delta y_i \cos\Theta} \tag{30}$$

$$a_i = Kx_i \cdot \cos\Theta \tag{31}$$

$$b_i = Kx_i \cdot \sin\Theta \tag{32}$$

$$c_i = Ky_i \cdot \cos\Theta \tag{33}$$

$$d_i = ky_i \cdot \cos\Theta \tag{34}$$

$\Theta_i$ is the angle between camera I coordinate system and the physical table coordinate system.

$Kx_1$, $Kx_2$, $Ky_1$, $Ky_2$ are the camera-motion scale factors of X and Y axis of camera 86 and camera 88 coordinate system unit vs. table coordinate system unit.

The average approach is used to measure the physical error which is demonstrated by the following. Assume line I and line I' are to be aligned.

The center point of line I is determined by $$\left[\frac{x_1+x_2}{2},\ \frac{y_1+y_2}{2}\right]$$

and the center point of line I' is determined by $$\left[\frac{x_1'+x_2'}{2},\ \frac{y_1'+y_2'}{2}\right]$$

Therefore the center point displacement between two lines is $$\Delta X = \frac{X_1+X_2}{2} - \frac{X_1'+X_2'}{2} = \frac{\Delta X_1 + \Delta X_2}{2} \quad (35)$$

$$\Delta Y = \frac{Y_1+Y_2}{2} - \frac{Y_1'+Y_2'}{2} = \frac{\Delta Y_1 + \Delta Y_2}{2} \quad (36)$$

The theta error can be found by $$\Delta\theta = 2\sin^{-1}\left(\frac{\sqrt{(\Delta X_{12})^2 + (\Delta Y_{12})^2}}{2T}\right) \quad (37)$$

here,

T is the distance between target 1 and target 2, $$\Delta X_{12} = \Delta X_1 - \Delta X_2$$

$$\Delta Y_{12} = \Delta Y_1 - \Delta Y_2$$

for $\Delta\theta \ll 1$, $\Delta X_{12} \gg \Delta Y_{12}$, $$\Delta\theta = 2\sin^{-1}\left(\frac{\Delta X_{12}}{2T}\right) \quad (38)$$

Figure 20:
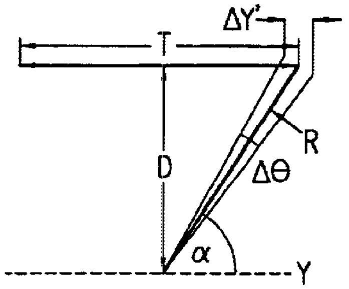
FIG. 20 is a schematic representation of certain additional geometrical relationships used in the development of the control algorithm.

Since the target line to be registered is off the pivot center, additional translation error will be introduced bye θ correction. The additional X error will be canceled out. The additional Y error can be determined by reference to FIG. 20, where: D=the distance between the Y axis and the fiducial line T; R=the distance from the origin to the fiducial; Δθ=rotation error; and ΔY'=the distance of Y axis offset generated by rotation through Δθ.

Thus, $$\Delta Y' = \Delta\theta \cdot R \cdot \sin\alpha = \Delta\theta \cdot D \quad (39)$$

here D is the distance between Y axis and the target line T.

Therefore total Y move needed is the sum of (29) and (39).

Thus, we have $$\Delta\theta = 2\sin^{-1}\left(\frac{(a_1\cdot\Delta x_1 + b_1\cdot\Delta y_1) - (a_2\cdot\Delta x_2 + b_2\cdot\Delta y_2)}{2T}\right) \quad (40)$$

$$X = \frac{(a_1\cdot\Delta x_1 + b_1\cdot\Delta y_1) + (a_2\cdot\Delta x_2 + b_2\cdot\Delta y_2)}{2T} \quad (41)$$

$$\Delta Y = \frac{(-c_1\cdot\Delta x_1 + d_1\cdot\Delta y_1) + (-c_2\cdot\Delta x_2 + d_2\cdot\Delta y_2)}{2T}\Bigg) + \Delta\theta\cdot D \quad (42)$$

The resolution and range of travel of the preferred apparatus 40 is determined as follows. The discussion can be limited within $$\left[0,\ \frac{\pi}{2}\right]$$

since it is symmetrical.

The following parameter design values are used for verification.

All motor encoders in the preferred embodiment are 4000 pulse/rev. so that one encoder pulse generates Δα=Δβ=Δγ=0.09°. M=3.0", $C_x$=$C_y$=0.050", T=5.562", D=7.09".

1. Resolution a. X axis

From (8), we have $$\Delta X = C_x(\sin(\alpha_1+\Delta\alpha) - \sin\alpha_1)$$

Apply the first and the second derivative and use them $$\frac{\partial(\Delta X)}{\partial(\Delta\alpha)} = C_x\cos(\alpha_1+\Delta\alpha) = 0 \quad (43)$$

$$\frac{\partial^2(\Delta X)}{\partial(\Delta\alpha)^2} = -C_x\sin(\alpha_1+\Delta\alpha) < 0 \quad (44)$$

From (43), the extreme value is achieved at $$\alpha_1 + \Delta\alpha = \frac{\pi}{2}$$

or $$\alpha_1 = 90° - \Delta\alpha$$

From (44), it indicates that it is a monotonous decreasing function,

Thus $$\text{minimum } \Delta X = C_x(1-\sin(90°-\Delta\alpha)) \quad (45)$$

The maximum is achieved at $$\alpha_1 = 0$$

$$\text{maximum } \Delta X = C_x \sin(\Delta\alpha) \quad (46)$$

In this design, $$X \text{ Resolution} = 0.05\sin(0.09°) = 0.000078539"$$

b. Y axis

Similarly, $$\text{minimum } \Delta Y = C_y(1-\sin(90°-\Delta\alpha)) \quad (47)$$

$$\text{maximum } \Delta Y = C_y \sin(\Delta\gamma) \quad (48)$$

In this design, $$Y \text{ Resolution} = 0.000078539"$$

c. T axis

From (5), $$\sin\alpha_2 = \frac{M}{C_x}(\sin(\theta_1+\Delta\theta) - \sin\theta_1) + \sin\alpha_1 \quad (49)$$

-continued $$\therefore \Delta\theta = \sin^{-1}\left(\frac{C_x}{M}(\sin(\alpha_1+\Delta\alpha)-\sin\alpha_1)+\sin\theta_1\right)-\theta_1$$

Apply the first derivative and use it $$\frac{\partial(\Delta\theta)}{\partial\Delta\alpha} = \frac{\frac{C_x}{M}\cos(\alpha_1+\Delta\alpha)}{\sqrt{1-\left(\frac{C_x}{M}(\sin(\alpha_1+\Delta\alpha)-\sin\alpha_1)+\sin\theta_1\right)^2}} = 0$$

It can be found, with (49), (3) and (4), that at $$\alpha_1=90°-\Delta\alpha$$

minimum $$\Delta\theta = \sin^{-1}\left(\frac{C_x}{M}\right)-\sin^{-1}\left(\frac{C_x}{M}\sin(90°-\Delta\alpha)\right) \tag{50}$$

Similarly, the maximum obtained at $$\alpha_1=0$$

maximum $$\Delta\theta = \sin^{-1}\left(\frac{C_x}{M}-\sin(\Delta\alpha)\right) \tag{51}$$

In this design,

T Resolution $$\theta = \sin^{-1}\left(\frac{0.005}{3}\sin(0.09°)\right) = 0.0015°$$

$$AX_\theta = \sin\left(\frac{\Delta\theta}{2}\right)T = \sin(0.0015/2)\cdot 5.562 = (0.000072806''$$

2. Travel range a. X axis

From (8)

$$\Delta X=C_x(\sin(\alpha_1+\Delta\alpha)-\sin\alpha_1)$$

For $$\alpha=-90°$$

$$\alpha_1+\Delta\alpha=90°$$

X travel range $$\Delta X=2C_x \tag{52}$$

In this design, maximum X travel=0.1"

b. Y axis

Similarly, Y travel range $$\Delta Y=2C_y \tag{53}$$

In this design, maximum Y travel=0.1"

c. θ axis

From (49)

$$\Delta\theta = \sin^{-1}\left(\frac{C_x}{M}(\sin(\alpha_1+\Delta\alpha)-\sin\alpha_1)+\sin\theta_1\right)-\theta_1$$

$$\sin^{-1}\left(\frac{C_x}{M}(\sin(\alpha_1+\Delta\alpha)-\sin\alpha_1)+\frac{C_x}{m}\frac{\sin\alpha_1+\sin\beta_1}{2}\right)-\sin^{-1}\left(\frac{C_x}{M}\frac{\sin\alpha_1+\sin\beta_1}{2}\right)$$

For $$\alpha=-90°$$

$$\beta_1=-90°$$

$$\alpha_1+\Delta\alpha=90°$$

θ travel range $$\Delta\theta = -\sin^{-1}\left(\frac{-C_x}{M}\right)=\sin^{-1}\left(\frac{C_x}{M}\right) \tag{54}$$

In this design, maximum θ travel=0.9549738730°

$$\Delta X_\theta = \sin\left(\frac{\Delta\theta}{2}\right)T = \sin(0.955/2)\cdot 5.562 = 0.04635''$$

Figure 17A:
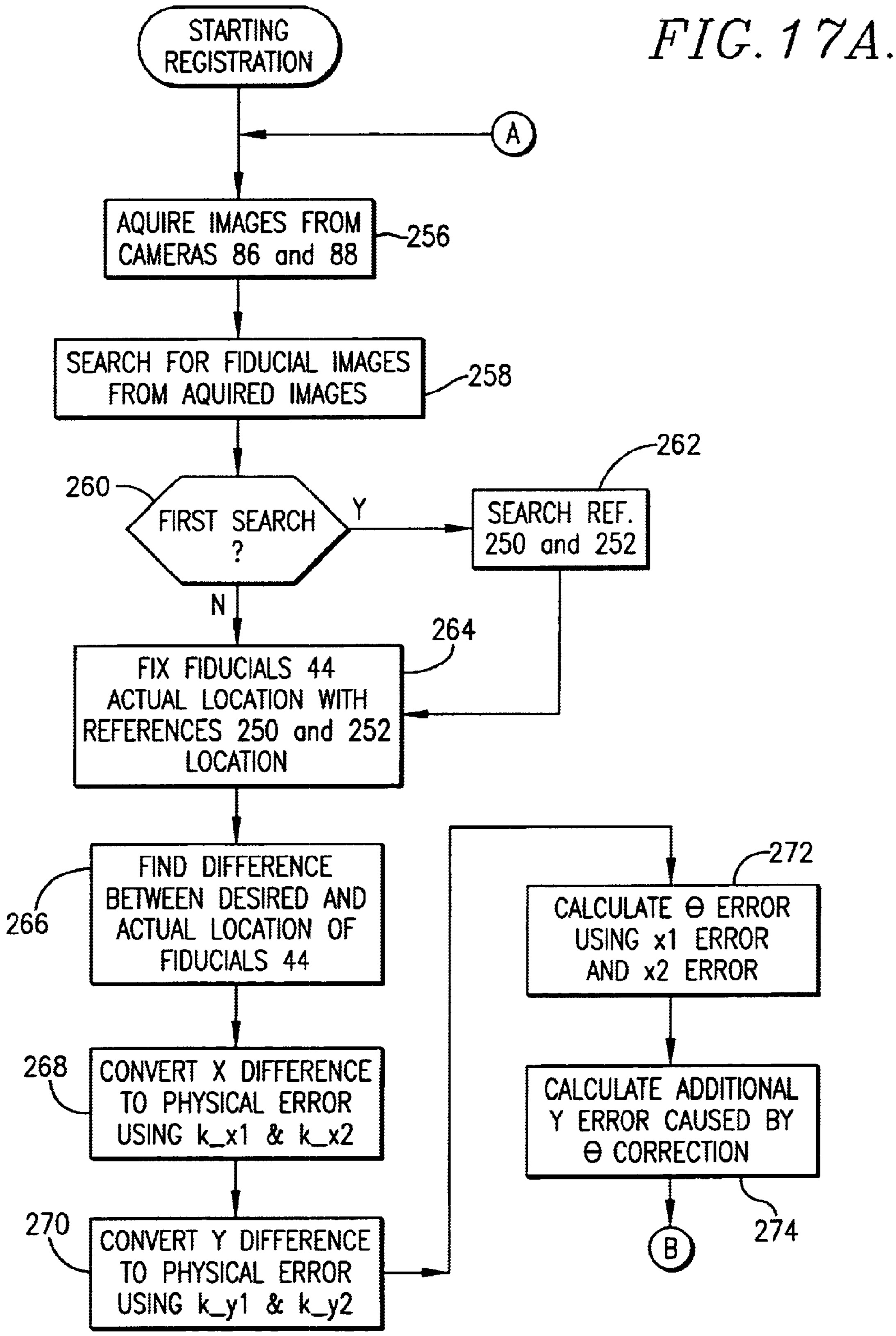
FIGS. 17A and 17B are together a flow diagram of the preferred control software employed in the web-fed apparatus of FIG. 1 for accurate positioning of successive web segments within the die cutting station.
Figure 17B:
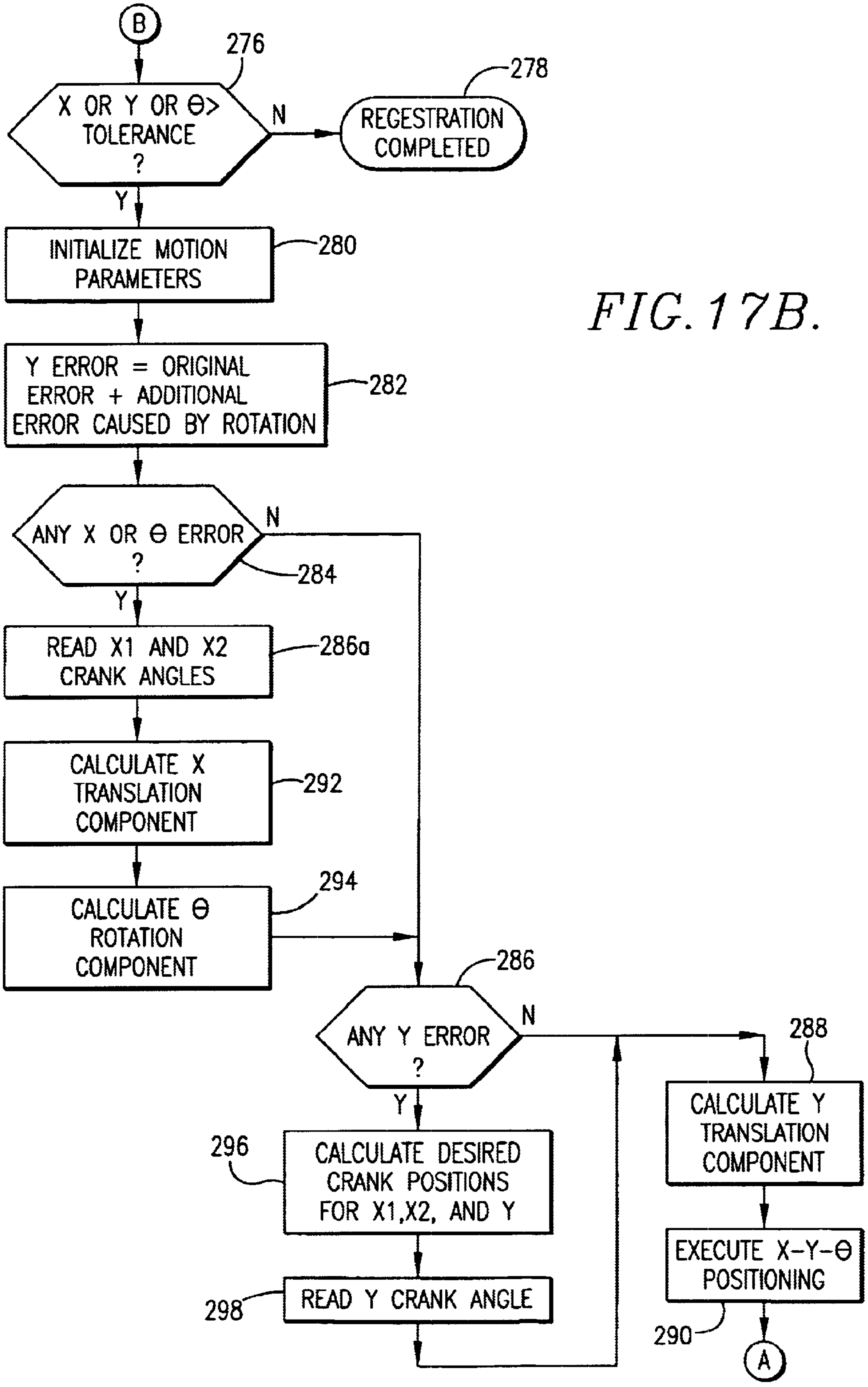

Attention is next directed to FIGS. 17A and 17B which is a flow chart of the preferred software incorporating the above-described algorithm. This software is stored in computer controller 254, the latter being connected to the drive unit encoders and stepper motors, as well as to the cameras 86, 88 (see FIG. 11).

In the first step, the segment registration operation is started as at 256 by acquiring images from the cameras 86, 88. As explained previously, such images include data respecting the reference indicia 250, 252, as well as the actual locations of the fiducials 44 on the segment 38. These acquired images are then searched (step 258) to determine the fiducial images therein. A first search (step 260) initiates this determination. In the initial subroutine, the data respecting the reference indicia 250, 252 is obtained (step 262) and the actual locations of the fiducials 44 is fixed as compared with the location of reference indicia 250, 252 (step 264). In subsequent determinations, the step 262 may be dispensed with, owing to the fact that the reference indicia 250, 252 are fixed.

In the next step 266, the program determines the differences between the desired and actual locations of the fiducials 44. This data is then manipulated to convert the X-axis differences and Y-axis differences to physical error as described in the algorithm above (steps 268, 270). The determination made in these latter steps is then employed to calculate the θ error (272), followed by calculation of additional Y-axis error caused by θ correction, step 274, see FIG. 20 and associated discussion above.

The program next determines if the X, Y and θ values for the fiducials 44 are within preselected tolerances (step 276). If these values are within tolerance, the registration operation is complete as shown in step 278, and no adjustment of the segment 38 through the medium of vacuum plate 142 is required. However, if any of these values are outside of tolerance, the program next determines how and to what extent vacuum plate 142 must be moved to correct the registration.

In the first step, the motion parameters are initialized (step 280), and the Y-axis error is determined as the sum of the original error plus any additional error caused by rotation (step 282). Next, the program determines whether there is any X-axis or θ error (step 284). If no such error is determined, the program advances to step 286 and determines if there is any Y-axis error. If the answer is no, the program next performs step 288 and calculates the necessary Y-axis translation component. The final step is the execution of positioning instructions as necessary to the stepper motors 184 of the respective drive units 178–182 (step 290) and a return to the starting point for the next determination.

On the other hand, if in step 284 X-axis and/or θ error is determined, the X1 and X2 crank angles are read via the stepper motor encodens (step 286*a*) and X-axis and θ translation and rotation components are calculated (steps 292, 294). The program then proceeds to step 286 as previously mentioned. Again, if no Y-axis error is ascertained in step 286, the program proceeds to execute steps 288, 290. However, if such error is determined, the program calculates the desired crank positions for the X1, X2 and Y drive units (step 296) and the Y crank angle is read (step 298). Upon completion of these routines, the program then proceeds to completion through steps 288 and 290 as shown.

Figure 12:
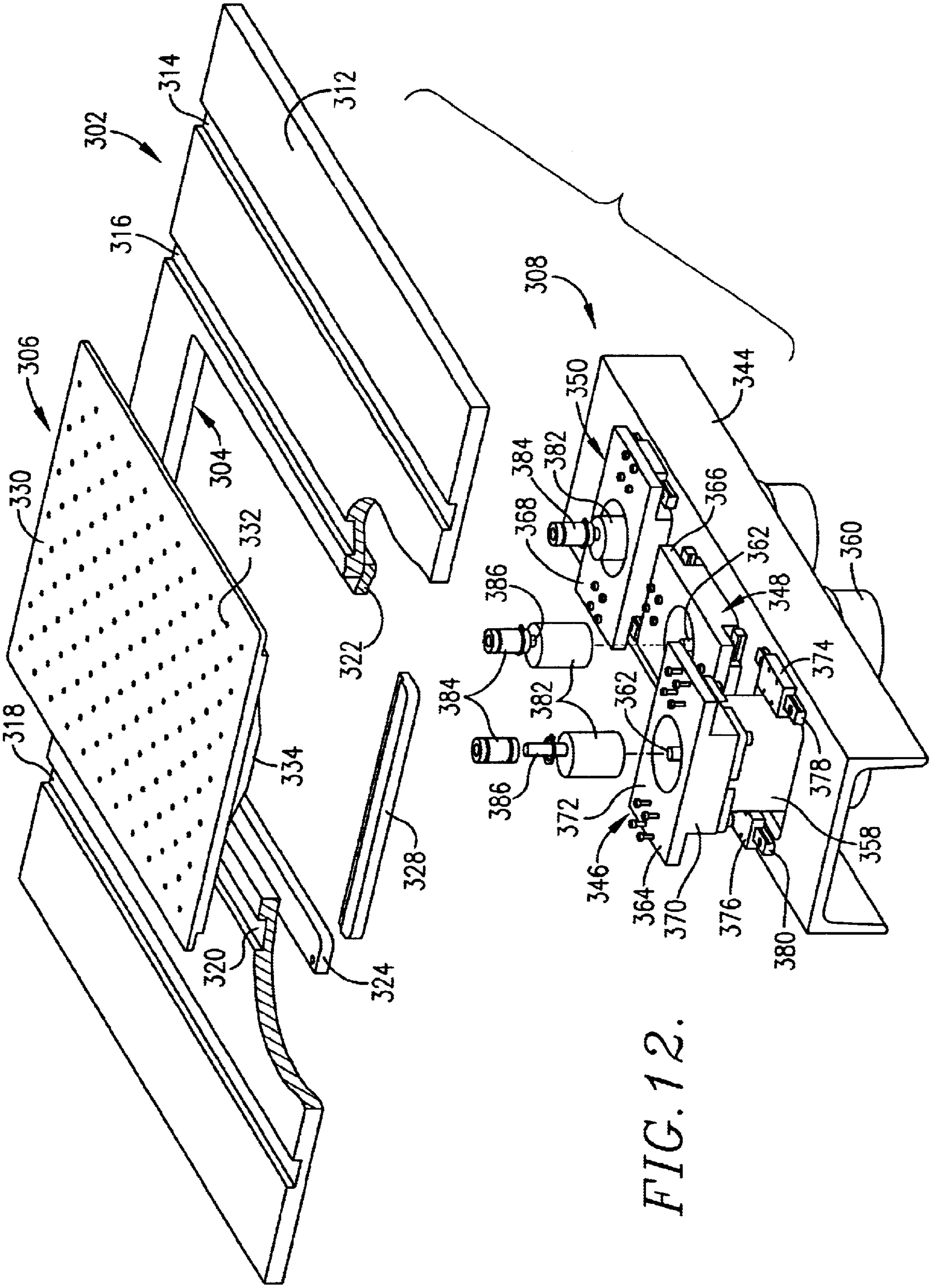
FIG. 12 is an exploded perspective view of the components of a second embodiment of the invention, designed for sheet-fed operation.
Figure 13:
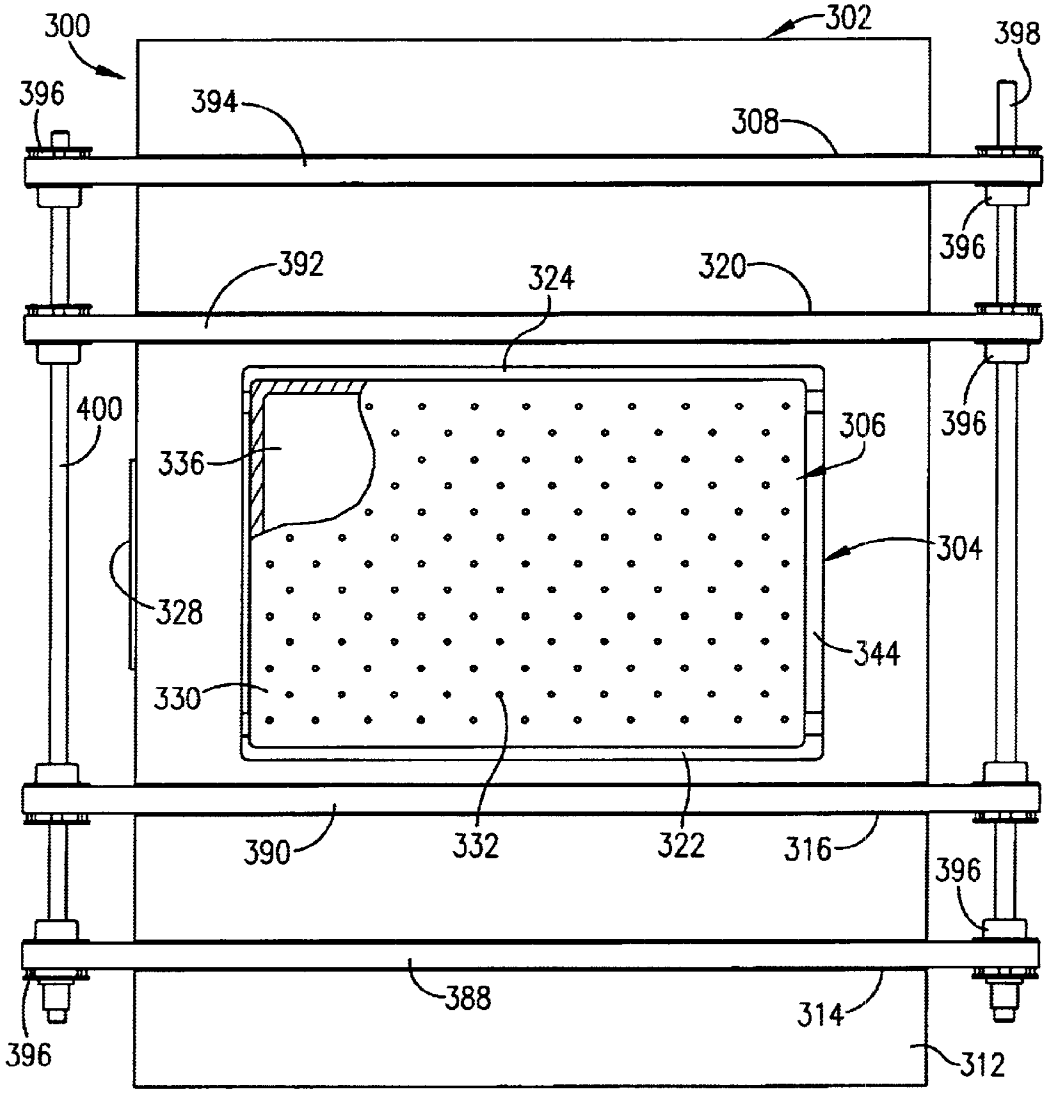
FIG. 13 is a plan view with parts broken away for clarity of the apparatus of FIG. 12.

Attention is next directed to FIGS. 12–16 which illustrate another embodiment in accordance with the invention wherein segments in the form of sheets can be processed (as used herein, the term "segment" with reference to material to be processed in the devices of the invention is intended to cover both portions of a continuous web and discrete sheets). As shown in FIG. 13, the positioning assembly 300 of a sheet fed processing apparatus such as a die cutter or laminating unit is depicted. The assembly 300 broadly includes a sheet of segment support 302 having a central, generally rectangular opening 304, with a vacuum hold-down plate 306 disposed within the opening 304, a motive assembly 308 operatively coupled with the plate 306, and a sheet feeder assembly 310.

Figure 14:
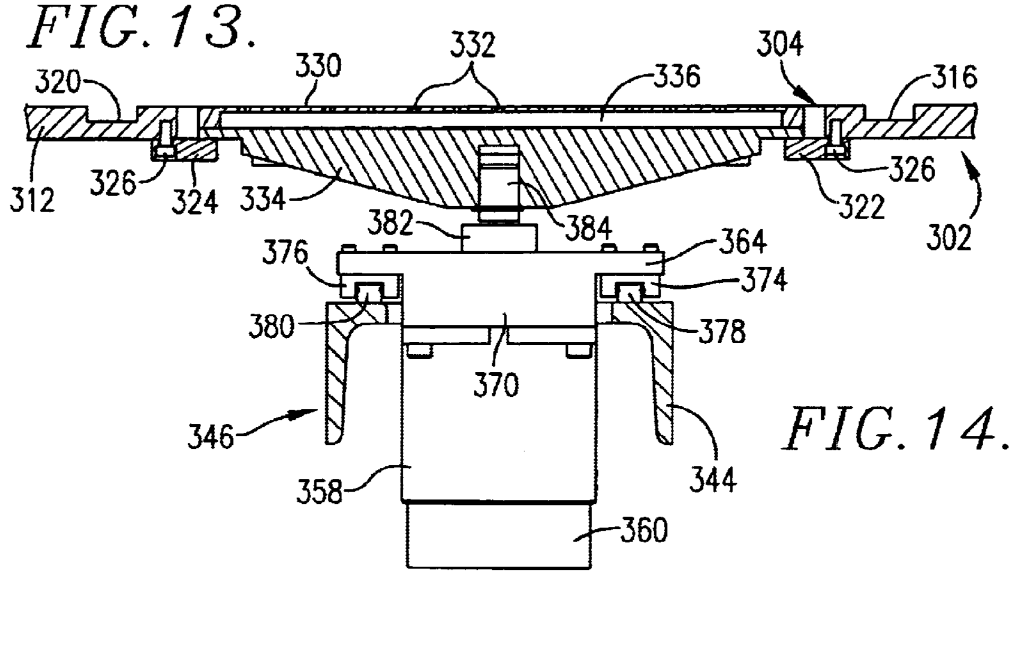
FIG. 14 is a vertical sectional view of the apparatus of FIGS. 12–13.

In more detail, the support 302 is in the form of a metallic plate 312 having two pairs of beltway slots 314, 316 and 318, 320 respectively disposed on opposite sides of the opening 304. The support 302 also includes a pair of elongated, bar-like elements 322, 324 secured to the underside thereof adjacent the side margins of opening 304 and extending inwardly as best seen in FIG. 14. The elements 322, 324 are secured to plate 312 by means of fasteners 326. A nose member 328 is similarly secured to the underside of plate 312 adjacent the leading transverse edge thereof.

Figure 15:
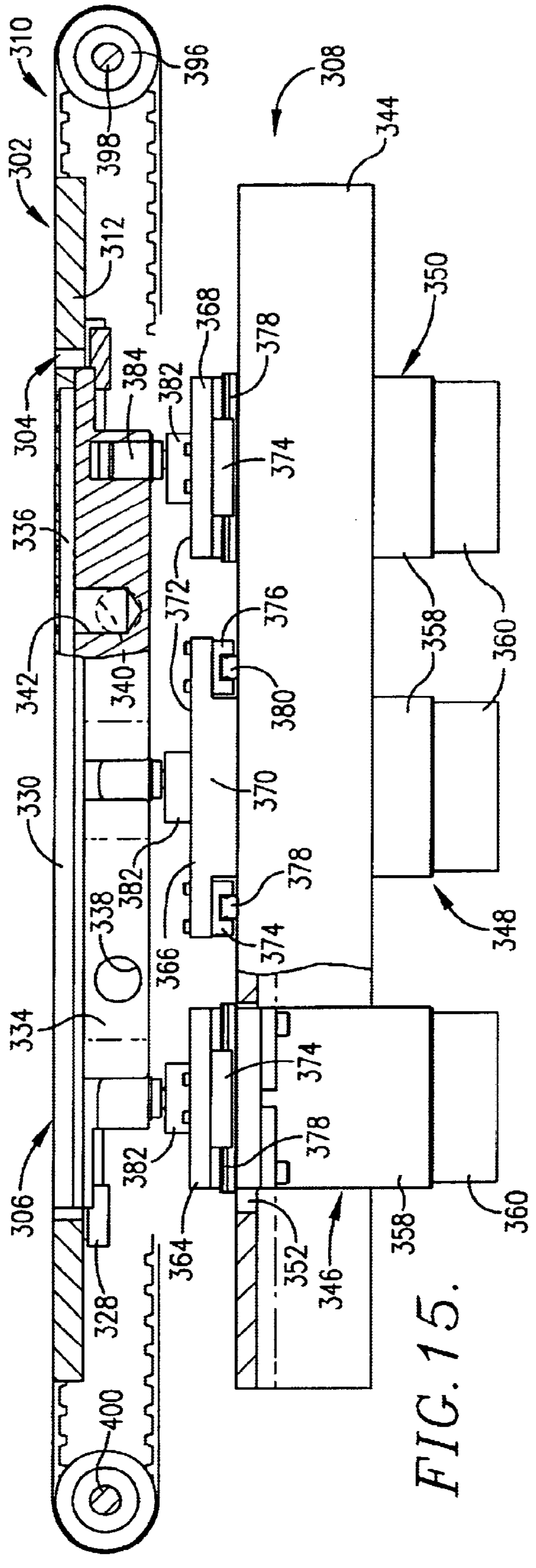
FIG. 15 is a fragmentary side view in partial vertical section of the sheet-fed apparatus of FIG. 12.
Figure 16:
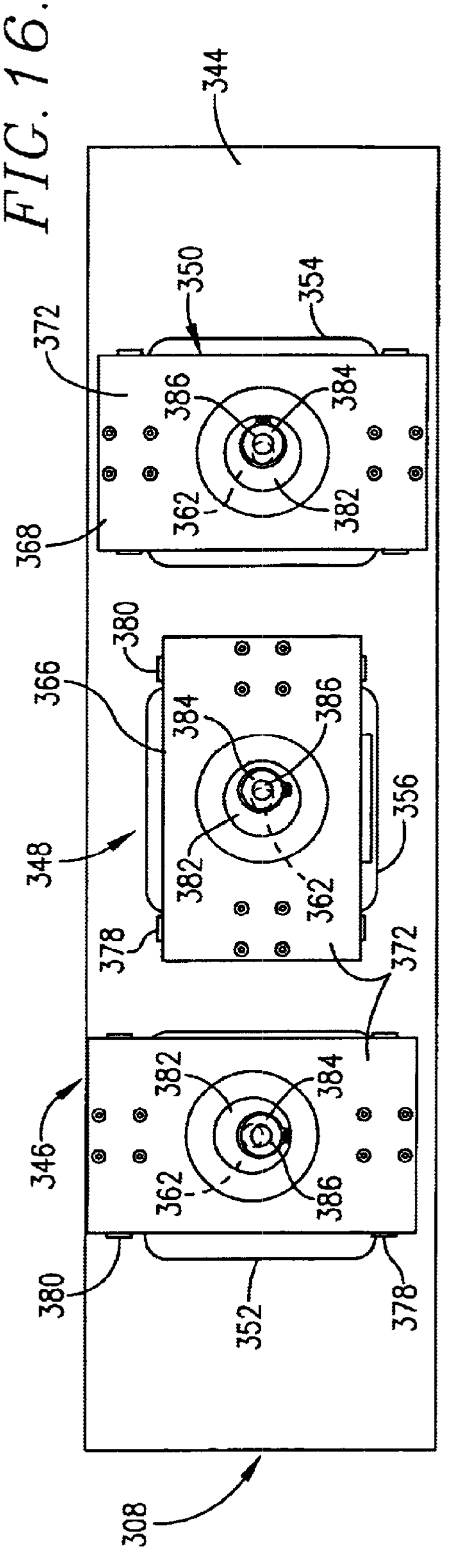
FIG. 16 is a plan view of the three-motor drive unit forming a part of the sheet-fed apparatus of FIG. 12.

The hold-down plate 306 includes an uppermost metallic plate 330 having a series of vacuum apertures 332 therethrough. The plate 330 is secured to an underlying block 334 which cooperatively define a plenum 336 directly beneath plate 330 (see FIG. 14). A pair of vacuum ports 338, 340 are provided in block 334, these communicating with plenum 336 via vertical passageways 342 (FIG. 15). The ports 338, 340 are adapted for connection with a vacuum system, not shown. The plate 330 and block 334 are supported within opening 304 by means of the elements 322, 324. As illustrated in FIG. 13, the opening 304 is sized to be somewhat larger than the plate 330, so as to permit limited movement of the latter within the confines of the opening 304.

The motive assembly 308 includes an elongated channel 344 disposed beneath block 334 and supports three spaced apart stepper motor drive units 346, 348 and 350. To this end, the channel 344 has three generally rectangular openings provided therethrough, namely endmost openings 352 and 354 oriented with the longitudinal axes transverse relative to the longitudinal axis of channel 344, and central opening 356 oriented with its longitudinal axis parallel to that of the channel 344. Each of the drive units includes a stepper motor 358 as well as an associated encoder 360 and a rotatable output shaft 362. In addition, each of the units has a carriage 364, 366 or 368 allowing the unit to translate during operation of assembly 30. Each such carriage is in the form of a centrally apertured block having generally T-shaped sidewall surfaces 370 and an apertured top wall surface 372. Each carriage 364–368 is provided with a pair of depending yoke bearings 374, 376. In the case of endmost carriages 364 and 368, such yoke bearings are oriented parallel to the longitudinal axis of channel 344, whereas with central carriage 366, the yoke bearings are oriented perpendicular to this longitudinal axis. A pair of rail-type guides 378, 380 are affixed to channel 344 on opposite sides of each opening 352–356 and mate with the described yoke bearings for each carriage 364–368. Thus, the guides 378–380 for the endmost carriages 364–368 are aligned with the longitudinal axis of the channel 344, with the guides for the central carriage 366 being perpendicular to this axis.

The stepper motors 358 of each drive unit 346–350 is operatively coupled to the underside of block 334 through an eccentric coupling mechanism. An eccentric block 382 is secured to each motor output shaft 362 as best seen in FIG. 12. The block 334 is equipped with three spaced apart stationary couplers 384 each having a downwardly projecting pin 386. The pins 386 are received with appropriate offset openings in the corresponding eccentric block 382. The center-to-center distance between the pins 362, 386 for each unit define the crank length for that unit. Also, the axes of the three pins 386 lie in a common rectilinear line.

The feeder assembly 310 includes a total of four continuous belts 388, 390, 392 394 mounted on pulleys 396. The pulleys 396 are rotationally mounted on appropriate cross-shafts 398, 400. The upper stretches of each of the belts 388–394 are received within the corresponding beltway slots 314–320, as will be understood from a consideration of FIGS. 13 and 15.

In the operation of assembly 300, a sheet is initially fed via the belts 388–394 for coarse positioning on plate 312. At this point, the vacuum system is actuated so that a vacuum is drawn through apertures 332 to thus hold the sheet. The drive units 346–350 are then actuated as necessary so as to shift the plate 306 and block 334 within opening 304 so as to accurately position the sheet within the assembly 300. A die cutting or laminating or other operation can then be performed on the accurately positioned sheet, whereupon the assembly 310 can again be actuated to move the processed sheet out of the assembly.

It will be understood that the motive assembly 308 can be controlled in a manner similar to that described in connection with the first embodiment; or by any other equivalent means. In general, all that is required is that reference data be provided which corresponds to the desired final position for the sheet, together with means for comparing the actual initial location of the sheet with this reference data. With this information, the drive units 346–350 can be appropriately operated for the final accurate positioning of the sheet.

Use of the invention allows high speed operations on the order of 40–45 strokes/minute with 200 millisecond dwell times between strokes.

Although the invention has been described in detail in the content of die cutting apparatus, the invention is not so limited. Rather, the invention may find utility in a number of applications requiring high speed, high accuracy repeat operations, such as various painting techniques.

We claim:

1. In processing apparatus for receiving and processing individual segments of material including an element for receiving and supporting said individual material segments, the improvement which comprises positioning apparatus for accurate adjustment of said element, said positioning apparatus comprising:

first, second and third selectively actuatable adjusting units each including a motor equipped with an output and a coupling assembly operatively coupling each motor output with said element at corresponding spaced, co-linear fixed points on the element;

fixed slide path-defining support structures separate from said element and each defining a respective fixed slide path independent of said element for each of said adjusting units, at least a portion of each adjusting unit being movably mounted on a corresponding one of the fixed slide path-defining support structures for translation therealong, two of said slide paths being co-linear and the other of said fixed slide paths being independent of and orthogonal to said two fixed slide paths, said element being shiftable in response to actuation of said adjusting units, said element being shiftable relative to each of said fixed slide paths during adjustment of the element; and a controller coupled with said adjusting units for selective actuation of said motors in order to adjust said element.

2. The processing apparatus of claim 1, said fixed slide path-defining supports structures comprising first, second and third rail guides respectively supporting the corresponding motors of said first, second and third adjusting units for said translation thereof.

3. The processing apparatus of claim 1, the translatable portion of each adjusting unit being mounted on the corresponding one of said fixed slide path-defining support structures along the corresponding one of said slide paths for passive shifting thereof in response to actuation of the motor of at least one of the other adjusting units.

4. The processing apparatus of claim 1, each of said fixed slide paths being essentially rectilinear.

5. The processing apparatus of claim 1, the translatable portion of each of said adjusting units including the corresponding motor of the adjusting unit.

6. The processing apparatus of claim 1, wherein each adjusting unit motor output includes a rotatable shaft, and wherein the coupling assembly associated with a respective adjusting unit is an eccentric coupler between a table and the corresponding motor output shaft.

7. The processing apparatus of claim 6, wherein each of said eccentric couplers includes a pin having an axis and rotatably received within the element at a corresponding fixed point, and an eccentric block, a portion of the eccentric block being connected to the pin and another portion of the block being connected to the corresponding motor output shaft in disposition such that the axis of the pin is in offset eccentric relationship to the axis of rotation of the shaft.

* * * * *